(12) United States Patent
Furukawa et al.

(10) Patent No.: US 6,381,310 B2
(45) Date of Patent: Apr. 30, 2002

(54) COMMUNICATION SUPPORT SYSTEM FOR PROVIDING TELEPHONE SERVICES TO A TELEPHONE USER BY REMOTE CONTROL OF A DATA PROCESSING DEVICE

(75) Inventors: Kimikazu Furukawa; Tomoyoshi Takebayashi; Toshihiro Azami; Katsutoshi Yano; Jun Kakuta; Yasuo Sato, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/046,556

(22) Filed: Mar. 24, 1998

(30) Foreign Application Priority Data

Sep. 19, 1997 (JP) .............................. 9-255794

(51) Int. Cl.[7] .............................................. H04M 1/64
(52) U.S. Cl. .................................................. 379/88.23
(58) Field of Search ........................ 379/88.22–88.24, 379/354, 355, 93.17, 93.23, 93.25, 88.01; 370/264; 348/14

(56) References Cited

U.S. PATENT DOCUMENTS

| | | | | |
|---|---|---|---|---|
| 5,046,188 A | * | 9/1991 | Molnar ..................... | 379/88.23 |
| 5,291,479 A | * | 3/1994 | Vaziri et al. ............... | 370/264 |
| 5,481,596 A | * | 1/1996 | Comerford ............... | 379/88.23 |
| 5,515,422 A | * | 5/1996 | Melampy et al. ........ | 379/88.23 |
| 5,524,141 A | * | 6/1996 | Braun et al. .............. | 379/93.25 |
| 5,577,041 A | * | 11/1996 | Sharma et al. ........... | 379/88.23 |
| 5,881,134 A | * | 3/1999 | Foster et al. ............. | 379/88.01 |
| 6,121,998 A | * | 9/2000 | Voois et al. ................ | 348/14 |

FOREIGN PATENT DOCUMENTS

| | | |
|---|---|---|
| JP | 2-272951 | 11/1990 |
| JP | 3-191644 | 8/1991 |
| JP | 4-061543 | 2/1992 |
| JP | 5-056190 | 3/1993 |
| JP | 5-075823 | 3/1993 |
| JP | 5-268303 | 10/1993 |
| JP | 8-030352 | 2/1996 |
| JP | 8-237299 | 9/1996 |
| JP | 9-116940 | 5/1997 |

* cited by examiner

*Primary Examiner*—David D. Knepper
(74) *Attorney, Agent, or Firm*—Staas & Halsey LLP

(57) ABSTRACT

A communication support system includes a command signal detection unit which detects a command signal sent by a telephone unit, the command signal indicating one of a plurality of telephone services. A telephone service recognition unit determines which of the plurality of telephone services is indicated by the command signal from the telephone unit. A telephone service processing unit executes a telephone service processing for the telephone service determined by the telephone service recognition unit, the telephone service processing unit starting execution of the telephone service processing in response to control data from the command signal detection unit.

20 Claims, 27 Drawing Sheets

FIG. 2

| TELEPHONE SERVICES | DTMF COMMAND SIGNALS | DIAL-PULSE COMMAND SIGNALS |
|---|---|---|
| RECORDING START | *1 | 1 |
| RECORDING END | *2 | 2 |
| PLAYBACK START | *3 | 3 |
| PLAYBACK END | *4 | 4 |
| FILE TRANSMISSION START | *7 | 7 |
| FILE TRANSMISSION END | *8 | 8 |
| TELEPHONE NUMBER ENTRY | *9 | 9 |

FIG. 3

| TELEPHONE SERVICES | FREQUENCIES OF COMMAND SIGNALS |
|---|---|
| RECORDING START | 1000 Hz |
| RECORDING END | 1100 Hz |
| PLAYBACK START | 1200 Hz |
| PLAYBACK END | 1300 Hz |
| FILE TRANSMISSION START | 1400 Hz |
| FILE TRANSMISSION END | 1500 Hz |
| TELEPHONE NUMBER ENTRY | 1600 Hz |

PRIOR ART

PRIOR ART

PRIOR ART

COMMUNICATION SUPPORT SYSTEM FOR PROVIDING TELEPHONE SERVICES TO A TELEPHONE USER BY REMOTE CONTROL OF A DATA PROCESSING DEVICE

BACKGROUND OF THE INVENTION

1. Field of the Invention

The present invention relates to a communication support system in which a telephone unit is connected through a communication control device into a data processing device and the communication control device is connected to a telephone network in order to provide computer-assisted telephone services for a user of the telephone unit when the user remotely controls the data processing device by using the telephone unit. Further, the present invention relates to a computer readable medium which stores program code instructions for causing a processor to execute a telephone service processing in response to the remote control by the user of the telephone unit.

Personal computers for home use are becoming widespread. Modems have now been shrunk to a chip size, enhancing the popularity in personal computers. The increasing prevalence of the personal computers having a built-in modem makes it easier to access the Internet or other communication networks through telephone lines. In recent years, the telephone lines have been shared by the computers and the telephones.

In recent developments, there is a demand for a useful, advanced communication support system which enables a telephone user to use a telephone unit to remotely control a data processing device in order to obtain computer-assisted telephone services. Currently, the computer-assisted telephone services are provided only by locally operating the data processing device, and the telephones and the computers are separately used. Further, it is desired to provide a communication support system which allows the telephone user to easily transmit data to or receive data from other communication media.

2. Description of the Related Art

A conventional communication support system which provides existing telephone services by executing an application program installed in the system is known. The conventional communication support system provides the telephone services only when the user locally operates an input device (such as a keyboard or a mouse) of a personal computer. That is, when one of the telephone services is obtained from the conventional communication support system, the user must be located in front of the personal computer and locally operate the input device of the personal computer.

FIG. 29 shows such a conventional communication support system.

As shown in FIG. 29, the conventional communication support system generally has an existing telephone unit 301, a data processing device 304, and a line unit 303. The telephone unit 301 is connected through the line unit 303 into the data processing device 304, and the line unit 303 is connected to a telephone network 302. The data processing device 304 is, for example, a personal computer. The telephone network 302 is, for example, a public switched telephone network.

In the above-described conventional system, a voice input/output unit 305, a dialing unit 306 and a signal detection unit 307 are connected to the line unit 303. Further, a personal-computer (PC) interface unit 308 is provided between the data processing device 304 and the units 305 and 306.

The voice input/output unit 305 supplies a voice signal sent from the telephone unit 301 or the telephone network 302, to the data processing device 304 via the PC interface unit 308, and supplies a voice signal derived from digital data stored in the data processing device 304, to the telephone unit 301 or the telephone network 302. The dialing unit 306 provides an existing dialing function to transmit a call over the telephone network 302 to a destination terminal according to a telephone number input by an input device (such as a keyboard or a mouse) of the data processing device 304. The signal detection unit 307 detects various signals sent from a telephone line, such as a busy tone signal, a ring tone signal, a ring back tone signal, an on-hook signal, and an off-hook signal.

In the above-described conventional system, the telephone services are provided by an existing telephone-service application program executed by the data processing device (or the personal computer). Such telephone services include, for example, voice recording and playback, file transmission, and telephone number entry.

In the above-described conventional system, when a user of the data processing device 304 makes a call to the destination terminal, the application program installed in the data processing device 304 is executed. The user inputs the telephone number of the destination terminal and presses a dialing button on a monitor of the data processing device 304 by operating the input device (such as the keyboard or the mouse) of the data processing device 304. In this case, the user lifts a handset of the telephone unit 301 located away from the data processing device 304, and then the off-hook signal is detected by the signal detection unit 307. The telephone unit 301 is connected to the destination terminal by the line unit 303, and this enables the user to use the handset to communicate with a person of the destination terminal by voice.

However, in the above-described conventional system, it is impossible for the user to make a call to the destination terminal by using the telephone unit 301 to remotely control the application program on the data processing device 304.

In the above-described conventional system, when a voice recording function, as one of the telephone services, is obtained by executing the application program on the data processing device 304, the user of the data processing device 304 presses a recording start button on the monitor by operating the input device of the data processing device 304. In this case, the data processing device 304 acquires voice data from the telephone unit 301 or the telephone network 302 through the voice input/output unit 305. The application program on the data processing device 304 converts the voice data into digital data in a computer-readable format and stores the digital data in a memory of the data processing device 304. The application program continues to provide the voice recording until a recording end button on the monitor is pressed by the user.

However, in the above-described conventional system, it is impossible for the user to start the voice recording processing by using the telephone unit 301 to remotely control the application program on the data processing device 304.

In the above-described conventional system, when a playback function, as one of the telephone services, is obtained by executing the application program on the data processing device 304, the user of the data processing device 304 presses a playback start button on the monitor by operating the input device. In this case, the application program on the data processing device 304 converts the digital data stored in the memory of the device 304 into voice data, and supplies the voice data to the voice input/output unit 305. A voice signal is derived from the voice data by the voice input/output unit 305, and the voice signal is supplied to the telephone unit 301 or the telephone network 302 via the line unit 303. The application program continues to provide the playback function until a playback end button on the monitor is pressed by the user or the end of the data stored in the memory is detected.

However, in the above-described conventional system, it is impossible for the user to start the playback processing by using the telephone unit 301 to remotely control the application program on the data processing device 304.

Further, in the above-described conventional system, when a telephone number entry function, as one of the telephone services, is obtained by executing the application program on the data processing device 304, the user of the data processing device 304 inputs a telephone number by operating the input device. In this case, the application program on the data processing device 304 stores the input telephone number in the memory. The application program is executed to carry out the telephone number entry processing when the user operates the keyboard or the mouse in connection with the monitor in an interactive manner.

However, in the above-described conventional system, it is impossible for the user to start the telephone number entry processing by using the telephone unit 301 to remotely control the application program on the data processing device 304. It is impossible for the conventional system to detect a telephone number input by the telephone unit 301.

SUMMARY OF THE INVENTION

An object of the present invention is to provide an improved communication support system in which the above-mentioned problems are eliminated.

Another object of the present invention is to provide a communication support system which enables the telephone user to use the telephone unit to obtain computer-assisted telephone services by remotely controlling the data processing device.

Still another object of the present invention is to provide a communication control device for a communication support system including a telephone unit and a data processing device, which enables the telephone user to use the telephone unit to obtain computer-assisted telephone services by remotely controlling the data processing device.

A further object of the present invention is to provide a method of executing a telephone service processing in a communication support system which provides computer-assisted telephone services for the telephone user of the telephone unit when the user remotely controls the data processing device by using the telephone unit.

Another object of the present invention is to provide a computer readable medium storing program code instructions which causes a processor of a communication support system to execute a telephone service processing in response to a command signal sent by a telephone unit.

The above-mentioned objects of the present invention are achieved by a communication support system wherein a telephone unit is connected through a communication control device into a data processing device and the communication control device is connected to a telephone network, comprising: a command signal detection unit which detects a command signal sent by the telephone unit, the command signal indicating one of a plurality of telephone services; a telephone service recognition unit which determines which of the plurality of telephone services is indicated by the command signal from the telephone unit; and a telephone service processing unit which executes a telephone service processing for the telephone service determined by the telephone service recognition unit, the telephone service processing unit starting execution of the telephone service processing in response to control data from the command signal detection unit.

The above-mentioned objects of the present invention are achieved by a communication control device for a communication support system including a telephone unit and a data processing device wherein the communication control device is connected to a telephone network and the telephone unit sends a command signal indicating one of a plurality of telephone services, comprising: a line unit which connects the telephone unit through the communication control device into the data processing device and the telephone network; and a command signal detection unit which detects the command signal sent by the telephone unit, and transmits the command signal and control data to the data processing device so that the data processing device starts execution of a telephone service processing for the telephone service indicated by the command signal in response to the control data.

The above-mentioned objects of the present invention are achieved by a method of executing a telephone service processing in a communication support system wherein a telephone unit is connected through a communication control device into a data processing device and the communication control device is connected to a telephone network, comprising the steps of: detecting a command signal sent by the telephone unit, the command signal indicating one of a plurality of telephone services; transmitting the command signal and control data from the communication control device to the data processing device; determining which of the plurality of telephone services is indicated by the command signal from the telephone unit; and starting execution of a telephone service processing for the telephone service determined in said determining step, in response to the control data.

In the communication support system of the present invention, it is possible to provide the computer-assisted telephone services for the telephone user when the telephone user uses the telephone unit to remotely control the data processing device. The communication support system of the present invention allows the telephone user to more easily transmit data to or receive data from other communication media such as the data processing device. Further, the communication support system of the present invention allows the telephone user to use a cordless telephone to remotely control the data processing device. It is no longer necessary that the user be located in front of the data processing device when obtaining the computer-assisted telephone services from the communication support system.

BRIEF DESCRIPTION OF THE DRAWINGS

The above and other objects, features and advantages of the present invention will be more apparent from the following detailed description when read in conjunction with the accompanying drawings in which:

FIG. 2 is a diagram for explaining allocation of specified values to each of DTMF command signals and dial-pulse command signals;

FIG. 3 is a diagram for explaining allocation of specified frequencies to frequency-based command signals;

DETAILED DESCRIPTION OF THE PREFERRED EMBODIMENTS

A description will now be given of the preferred embodiments of the communication support system of the present invention with reference to the accompanying drawings.

Figure 1:
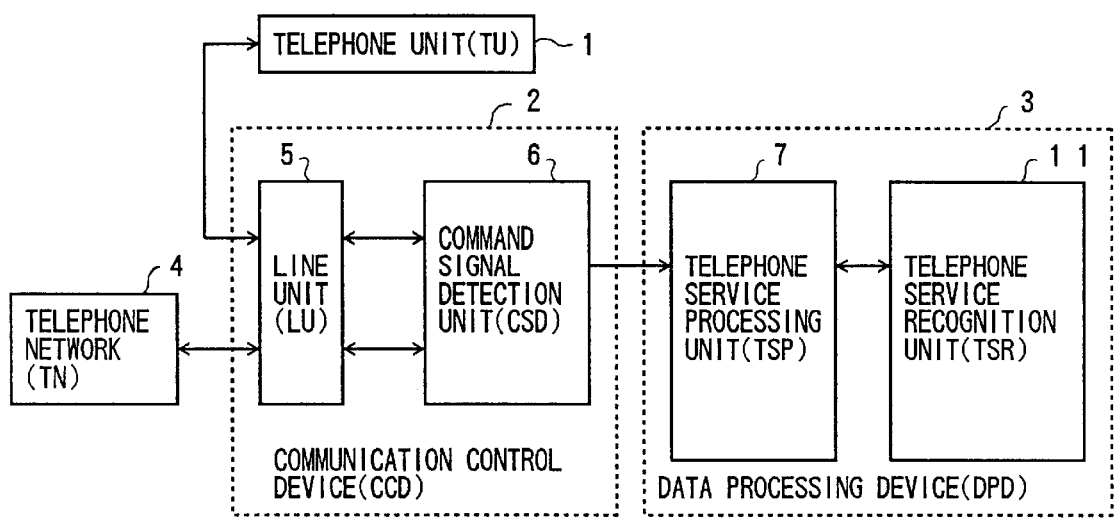
FIG. 1 is a block diagram of a communication support system of the present invention.

FIG. 1 shows a communication support system of the present invention.

As shown in FIG. 1, the communication support system generally has a telephone unit (TU) 1, a communication control device (CCD) 2, a data processing device (DPD) 3, and a telephone network (TN) 4. The telephone unit 1 is connected through the communication control device 2 to the telephone network 4. The data processing device 3 is connected through the communication control device 2 to the telephone network 4.

The telephone unit 1 provides existing voice transmission and reception functions and an existing dialing function.

The communication control device (CCD) 2 comprises a line unit (LU) 5 and a command signal detection unit (CSD) 6. The LU 5 connects the telephone unit 1 to the telephone network 4, and connects the data processing device 3 to the telephone network 4. The communication control device (CCD) 2 provides connection of the telephone unit 1 to the telephone network 4 and connection of the data processing device 3 to the telephone network 4.

In the communication control device 2, the command signal detection unit (CSD) 6 provides detection of a command signal sent by the telephone unit 1. The command signal from the telephone unit 1 indicates one of a plurality of telephone services. The command signal detection unit (CSD) 6 detects the command signal sent by the telephone unit 1. The CCD 2 transmits the command signal from the telephone unit 1 and control data from the CSD 6 to the data processing device (DPD) 3.

In the communication support system of FIG. 1, the data processing device (DPD) 3 comprises a telephone service processing unit (TSP) 7 and a telephone service recognition unit (TSR) 11. The TSR 11 determines which of the telephone services is indicated by the command signal from the telephone unit 1. The TSP 7 executes a telephone service processing for the telephone service determined by the telephone service recognition unit 11. The TSP 7 starts executing the telephone service processing in response to the control data from the CSD 6.

In the communication support system of FIG. 1, when power is not supplied to the CCD 2, the line unit 5 connects the telephone unit 1 to the telephone network 4 and disconnects the command signal detection unit (CSD) 6 from the telephone unit 1. When power is supplied to the CCD 2, the line unit 5 connects the telephone unit 1 through the command signal detection unit (CSD) 6 into the DPD 3 and the telephone network 4. The CSD 6 detects the command signal sent by the telephone unit 1 when power is supplied to the CCD 2. The CCD 2 transmits the command signal from the telephone unit 1 and control data from the CSD 6 to the data processing device (DPD) 3. In the DPD 3, the telephone service recognition unit (TSR) 11 determines which of the telephone services is indicated by the command signal from the telephone unit 1. The telephone service processing unit (TSP) 7 executes a telephone service processing for the telephone service determined by the TSR 11. The TSP 7 starts executing the telephone service processing in response to the control data from the CSD 6.

Next, a description will be given of the command signal sent by the telephone unit 1. FIG. 2 shows allocation of specified values to each of DTMF command signals and dial-pulse command signals. FIG. 3 shows allocation of specified frequencies to frequency-based command signals.

In a case in which a DTMF (dual-tone multiple frequency) pulse is used for the telephone unit 1 to transmit the command signal to the communication control device 2, specified values related to the ten-key pad of the telephone unit 1 are allocated to a plurality of DTMF command signals as shown in FIG. 2. The plurality of DTMF command signals respectively correspond to the plurality of telephone services which include, for example, voice recording and playback, file transmission and telephone number entry.

Alternatively, in a case in which a dial pulse is used for the telephone unit 1 to transmit the command signal to the communication control device 2, other specified values related to the ten-key pad of the telephone unit 1 may be allocated to a plurality of dial-pulse command signals, as shown in FIG. 2. The plurality of dial-pulse command signals respectively correspond to the plurality of telephone services.

Further, in a case in which a frequency-based command signal is used for the telephone unit 1, specified frequencies may be allocated to a plurality of frequency-based command signals as shown in FIG. 3. The plurality of frequency-based command signals respectively correspond to the plurality of telephone services.

Next, a description will be given of a detailed structure of the communication support system of the present invention in which the DTMF command signals of FIG. 2 are utilized.

However, the present invention is not limited to the case of the DTMF command signals. In the cases of the frequency-based command signals of FIG. 3 and the dial-pulse command signals of FIG. 2, the DTMF command signal may be replaced by the corresponding command signal without modification of the communication support system. The present invention can be applied to the communication support system in such cases in a similar manner.

Figure 4:
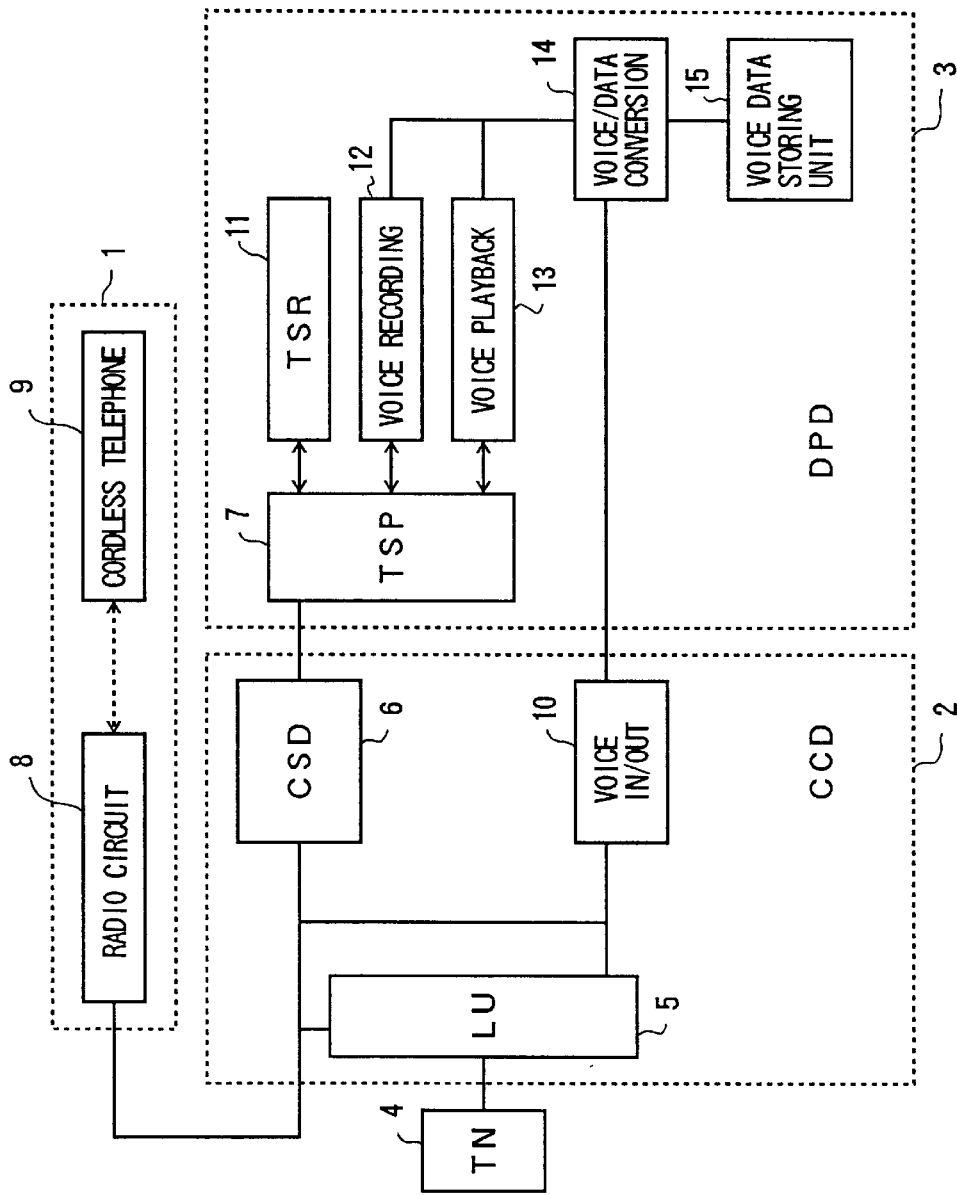
FIG. 4 is a block diagram of a telephone unit, a communication control device and a data processing device in the communication support system of the present invention.

FIG. 4 shows a telephone unit, a communication control device and a data processing device in the communication support system of the present invention.

Similar to the communication support system of FIG. 1, the communication support system of FIG. 4 generally has a telephone unit 1, a communication control device (CCD) 2, a data processing device (DPD) 3, and a telephone network (TN) 4. The telephone unit 1 is connected through the CCD 2 into the DPD 3, and the CCD 2 is connected to the TN 4. In FIG. 4, the elements which are the same as corresponding elements in FIG. 1 are designated by the same reference numerals, and a description thereof will be omitted.

In the communication support system of FIG. 4, the telephone unit 1 provides the existing voice transmission and reception functions and the existing dialing function. The telephone unit 1 of FIG. 4 comprises a radio circuit 8 and a cordless telephone 9. The cordless telephone 9 provides an existing radio signal transmission and reception function at a remote location of the radio circuit 8. The radio circuit 8 provides conversion of a radio signal from the cordless telephone 9 into voice data and conversion of voice data from the telephone line into a radio signal. According to the present invention, the telephone unit 1 is not limited to the cordless telephone 9.

The communication control device (CCD) 2 of FIG. 4 comprises a line unit (LU) 5, a command signal detection unit (CSD) 6, and a voice input/output unit (VOICE IN/OUT) 10. The LU 5 connects the telephone unit 1 to the telephone network 4, and connects the data processing device 3 to the telephone network 4. The communication control device (CCD) 2 provides connection of the telephone unit 1 to the telephone network 4 and connection of the data processing device 3 to the telephone network 4.

In the communication control device 2, the command signal detection unit (CSD) 6 provides detection of a DTMF command signal sent by the telephone unit 1. The DTMF command signal from the telephone unit 1 indicates one of the plurality of telephone services. The command signal detection unit (CSD) 6 detects the DTMF command signal sent by the telephone unit 1. The CCD 2 transmits the DTMF command signal from the telephone unit 1 and the control data from the CSD 6 to the data processing device (DPD) 3. The voice input/output unit 10 supplies a voice signal sent from either the telephone unit 1 or the telephone network 4, to the DPD 3, and supplies a voice signal derived from digital data stored in the DPD 3, to either the telephone unit 1 or the telephone network 4.

In the communication support system of FIG. 4, the data processing device (DPD) 3 comprises a telephone service processing unit (TSP) 7, a telephone service recognition unit (TSR) 11, a voice recording unit 12, a voice playback unit 13, a voice/data conversion unit 14, and a voice data storing unit 15.

In the data processing device (DPD) 3, the TSR 11 determines which of the telephone services is indicated by the DTMF command signal from the telephone unit 1. The TSP 7 executes a telephone service processing for the telephone service determined by the TSR 11. The TSP 7 starts executing the telephone service processing in response to the control data from the CSD 6.

Further, in the DPD 3, the TSP 7 controls the voice recording unit 12 so that the voice recording unit 12 executes a voice recording processing to record a voice signal on the connection line of the TU 1 and the TN 4. The voice/data conversion unit 14 converts the voice signal from the voice input/output unit 10 of the CCD 2 into voice data (or digital data) in a computer-readable format, and conversely converts the voice data into the voice signal. The voice data storing unit 15 stores the voice data from the voice/data conversion unit 14 in a memory of the DPD 3. The TSP 7 controls the voice playback unit 13 so that the voice playback unit 13 executes a voice playback processing to reproduce the voice signal from the voice data stored in the memory. The reproduced voice signal is transmitted from the voice/data conversion unit 14 to the voice input/output unit 10 of the CCD 2.

Therefore, in the communication support system of FIG. 4, the data processing device (DPD) 3 provides the telephone services, such as the voice recording and playback, based on the DTMF command signal sent by the telephone unit 1 when the telephone user uses the telephone unit 1 to remotely control the data processing device (DPD) 3. The communication support system of FIG. 4 allows the telephone user to more easily transmit data to or receive data from other communication media such as the data processing device. Further, the communication support system of FIG. 4 allows the telephone user to use the cordless telephone 9 in the telephone unit 1 to remotely control the data processing device (DPD) 3. It is no longer necessary that the user be located in front of the DPD 3 when obtaining the telephone services from the communication support system.

In the communication support system of FIG. 4, when power is not supplied to the CCD 2, the line unit 5 connects the telephone unit 1 to the telephone network 4 and disconnects the command signal detection unit (CSD) 6 from the telephone unit 1. When power is supplied to the CCD 2, the line unit 5 connects the telephone unit 1 through the command signal detection unit (CSD) 6 into the DPD 3 and the telephone network 4. The CSD 6 detects the DTMF command signal sent by the telephone unit 1 when power is supplied to the CCD 2. When the DTMF command signal accords with one of the DTMF command signals of FIG. 2, the CCD 2 notifies the DPD 3 that an event has occurred due to the DTMF command signal. The CCD 2 transmits the command signal from the telephone unit 1 and the control data from the CSD 6 to the DPD 3.

In the DPD 3, the telephone service recognition unit (TSR) 11 determines which of the telephone services is indicated by the command signal from the telephone unit 1. The telephone service processing unit (TSP) 7 executes a telephone service processing for the telephone service determined by the TSR 11. The TSP 7 starts executing the telephone service processing in response to the control data from the CSD 6.

For example, when the DTMF command signal "*1" is sent by the telephone unit 1, the TSR 11 determines that a recording start processing is indicated by the DTMF command signal. The TSP 7 executes the recording start processing so that the voice recording unit 12 is controlled to start performing the voice recording. When the DTMF command signal "*2" is sent by the telephone unit 1, the TSR 11 determines that a recording end processing is indicated by the DTMF command signal. The TSP 7 executes the recording end processing so that the voice recording unit 12 is controlled to finish the voice recording. When the DTMF command signal "*3" is sent by the telephone unit 1, the TSR 11 determines that a playback start processing is indicated by the DTMF command signal. The TSP 7 executes the playback start processing so that the voice playback unit 13 is controlled to start performing the voice playback. When the DTMF command signal "*4" is sent by the telephone unit 1, the TSR 11 determines that a playback end processing is indicated by the DTMF command signal. The TSP 7 executes the playback end processing so that the voice playback unit 13 is controlled to finish the voice playback.

When the voice recording processing is carried out by the voice recording unit 12, the voice data storing unit 15 stores the voice data from the voice/data conversion unit 14 in the memory of the DPD 3. On the other hand, when the voice playback processing is carried out by the voice playback unit 13, the voice data stored in the memory is read out, and the voice signal is reproduced from the voice data by the voice/data conversion unit 14. The reproduced voice signal is transmitted from the voice/data conversion unit 14 to the voice input/output unit 10 of the CCD 2.

Figure 5:
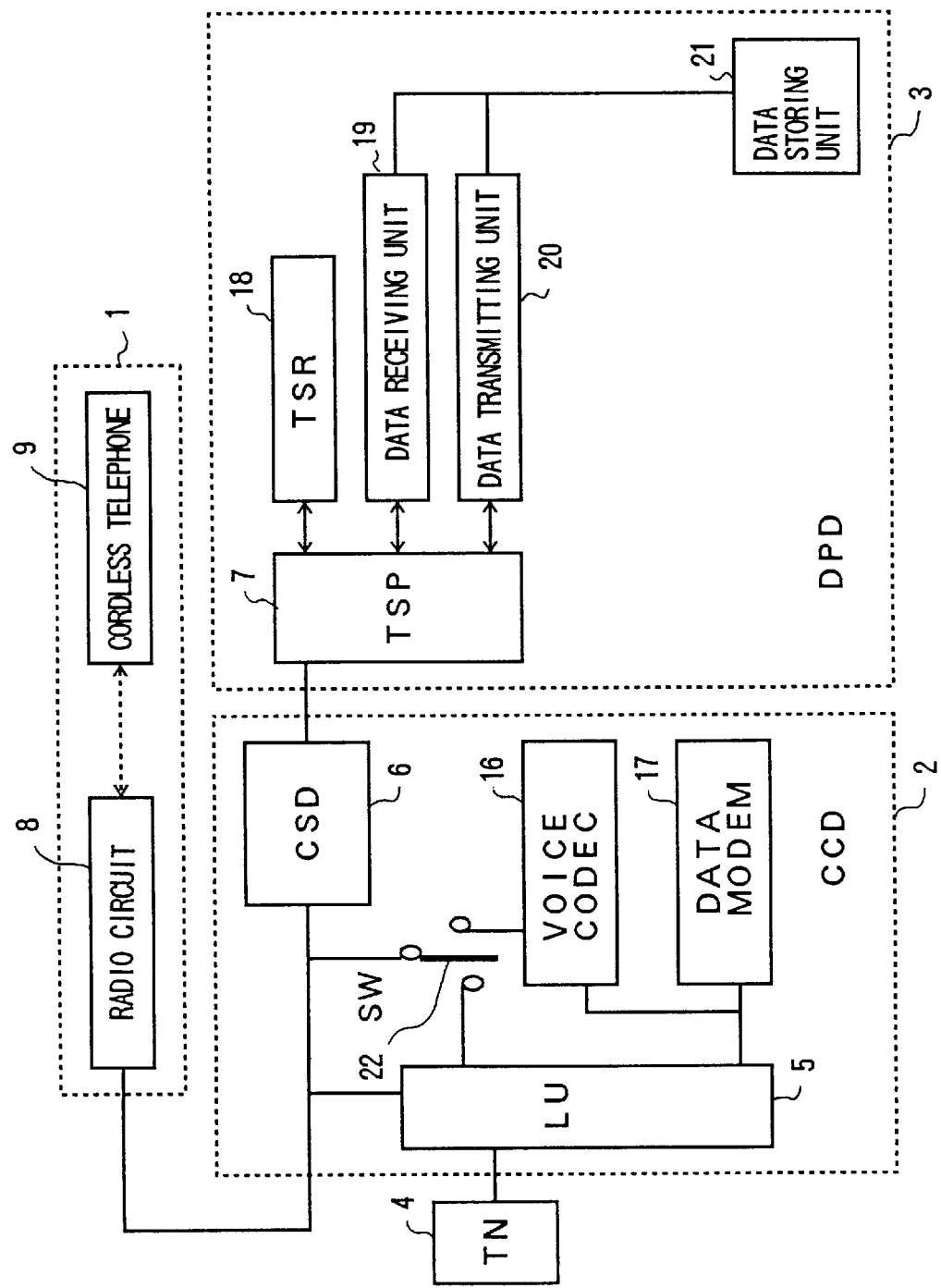
FIG. 5 is a block diagram of a telephone unit, a communication control device and a data processing device in the communication support system of the present invention.

FIG. 5 shows a telephone unit, a communication control device and a data processing device in the communication support system of the present invention.

Similar to the communication support system of FIG. 1, the communication support system of FIG. 5 generally has a telephone unit 1, a communication control device (CCD) 2, a data processing device (DPD) 3, and a telephone network (TN) 4. The telephone unit 1 is connected through the CCD 2 into the DPD 3, and the CCD 2 is connected to the TN 4. In FIG. 5, the elements which are the same as corresponding elements in FIG. 1 are designated by the same reference numerals, and a description thereof will be omitted.

In the communication support system of FIG. 5, the telephone unit 1 provides the existing voice transmission and reception functions and the existing dialing function. The telephone unit 1 of FIG. 5 comprises a radio circuit 8 and a cordless telephone 9. The cordless telephone 9 provides an existing radio signal transmission and reception function at a remote location of the radio circuit 8. The radio circuit 8 provides conversion of a radio signal from the cordless telephone 9 into voice data and conversion of voice data from the telephone line into a radio signal. According to the present invention, the telephone unit 1 is not limited to the cordless telephone 9.

The communication control device (CCD) 2 of FIG. 5 comprises a line unit (LU) 5, a command signal detection unit (CSD) 6, a voice coding/decoding unit (VOICE CODEC) 16, a data modulator/demodulator unit (DATA MODEM) 17, and a switch (SW) 22. The LU 5 connects the telephone unit 1 to the telephone network 4, and connects the data processing device 3 to the telephone network 4. The communication control device (CCD) 2 provides connection of the telephone unit 1 to the telephone network 4 and connection of the data processing device 3 to the telephone network 4.

In the communication control device 2, the command signal detection unit (CSD) 6 provides detection of a DTMF command signal sent by the telephone unit 1. The DTMF command signal from the telephone unit 1 indicates one of the plurality of telephone services. The command signal detection unit (CSD) 6 detects the DTMF command signal sent by the telephone unit 1. The CCD 2 transmits the DTMF command signal from the telephone unit 1 and the control data from the CSD 6 to the data processing device (DPD) 3. The voice coding/decoding unit (VOICE CODEC) 16 provides coding of a voice signal sent by the telephone unit 1 into transmission data, and provides decoding of transmission data from the telephone network 4 into a voice signal for the telephone unit 1. The data modulator/demodulator unit (DATA MODEM) 17 provides modulation and demodulation of transmission data in the CCD 2. The switch (SW) 22 switches on and off a connection line of the voice codec 16 and the CCD 2. The switch 22 normally switches off the connection line of the voice codec 16 and the CCD 2 to disconnect the voice codec 16 from the TN 4. When one of the telephone services is provided by the DPD 3, the switch 22 switches on the connection line of the voice codec 16 and the CCD 2 so that the voice codec 16 provides coding and decoding of voice data in the CCD 2.

In the communication support system of FIG. 5, the data processing device (DPD) 3 comprises a telephone service processing unit (TSP) 7, a telephone service recognition unit (TSR) 18, a data receiving unit 19, a data transmitting unit 20, and a data storing unit 21.

In the data processing device (DPD) 3, the TSR 18 determines which of the telephone services is indicated by the DTMF command signal from the telephone unit 1. The TSP 7 executes a telephone service processing for the telephone service determined by the TSR 18. The TSP 7 starts executing the telephone service processing in response to the control data from the CSD 6.

Further, in the DPD 3, the TSP 7 controls the data receiving unit 19 during a file transmission processing, so that the data receiving unit 19 receives transmission data from a telephone line connected to the telephone network 4. The data storing unit 21 stores the transmission data received by the data receiving unit 19, in a memory of the DPD 3. The TSP 7 controls the data transmitting unit 20 during the file transmission processing, so that the data transmitting unit 20 transmits the transmission data, stored in the memory, to the telephone line connected to the telephone network 4.

Therefore, in the communication support system of FIG. 5, the data processing device (DPD) 3 provides the telephone service, such as the file transmission, based on the DTMF command signal sent by the telephone unit 1 when the telephone user uses the telephone unit 1 to remotely control the data processing device (DPD) 3. The communication support system of FIG. 5 allows the telephone user to more easily transmit data to or receive data from other communication media such as the data processing device. Further, the communication support system of FIG. 5 allows the telephone user to use the cordless telephone 9 in the telephone unit 1 to remotely control the data processing device (DPD) 3. It is no longer necessary that the user be located in front of the DPD 3 when obtaining the file transmission service from the communication support system.

In the communication support system of FIG. 5, when power is not supplied to the CCD 2, the line unit 5 connects the telephone unit 1 to the telephone network 4 and disconnects the command signal detection unit (CSD) 6 from the telephone unit 1. When power is supplied to the CCD 2, the line unit 5 connects the telephone unit 1 through the command signal detection unit (CSD) 6 into the DPD 3 and the telephone network 4. The CSD 6 detects the DTMF command signal sent by the telephone unit 1 when power is supplied to the CCD 2. When the DTMF command signal accords with one of the DTMF command signals of FIG. 2, the CCD 2 notifies the DPD 3 that an event has occurred due to the DTMF command signal. The CCD 2 transmits the command signal from the telephone unit 1 and the control data from the CSD 6 to the DPD 3.

In the DPD 3, the telephone service recognition unit (TSR) 18 determines which of the telephone services is indicated by the command signal from the telephone unit 1. The telephone service processing unit (TSP) 7 executes a telephone service processing for the telephone service determined by the TSR 18. The TSP 7 starts executing the telephone service processing in response to the control data from the CSD 6.

For example, when the DTMF command signal "*7" is sent by the telephone unit 1, the TSR 18 determines that a file transmission start processing is indicated by the DTMF command signal. The TSP 7 executes the file transmission start processing so that the data receiving unit 19 and the data transmitting unit 20 are controlled to start performing the file transmission. When the DTMF command signal "*8" is sent by the telephone unit 1, the TSR 18 determines that a file transmission end processing is indicated by the DTMF command signal. The TSP 7 executes the file transmission end processing so that the data receiving unit 19 and the data transmitting unit 20 are controlled to finish the file transmission. The reception of the transmission data is automatically carried out by the DPD 3, and does not require the remote control by the telephone unit 1.

When the transmission data is received by the data receiving unit 19, the data storing unit 21 stores the data sent to the DPD 3 by the data modem 17 of the CCD 2, in the memory of the DPD 3. On the other hand, when the transmission data is transmitted by the data transmitting unit 20, the transmission data stored in the memory is read out and transmitted to the data modem 17 of the CCD 2.

Figure 6:
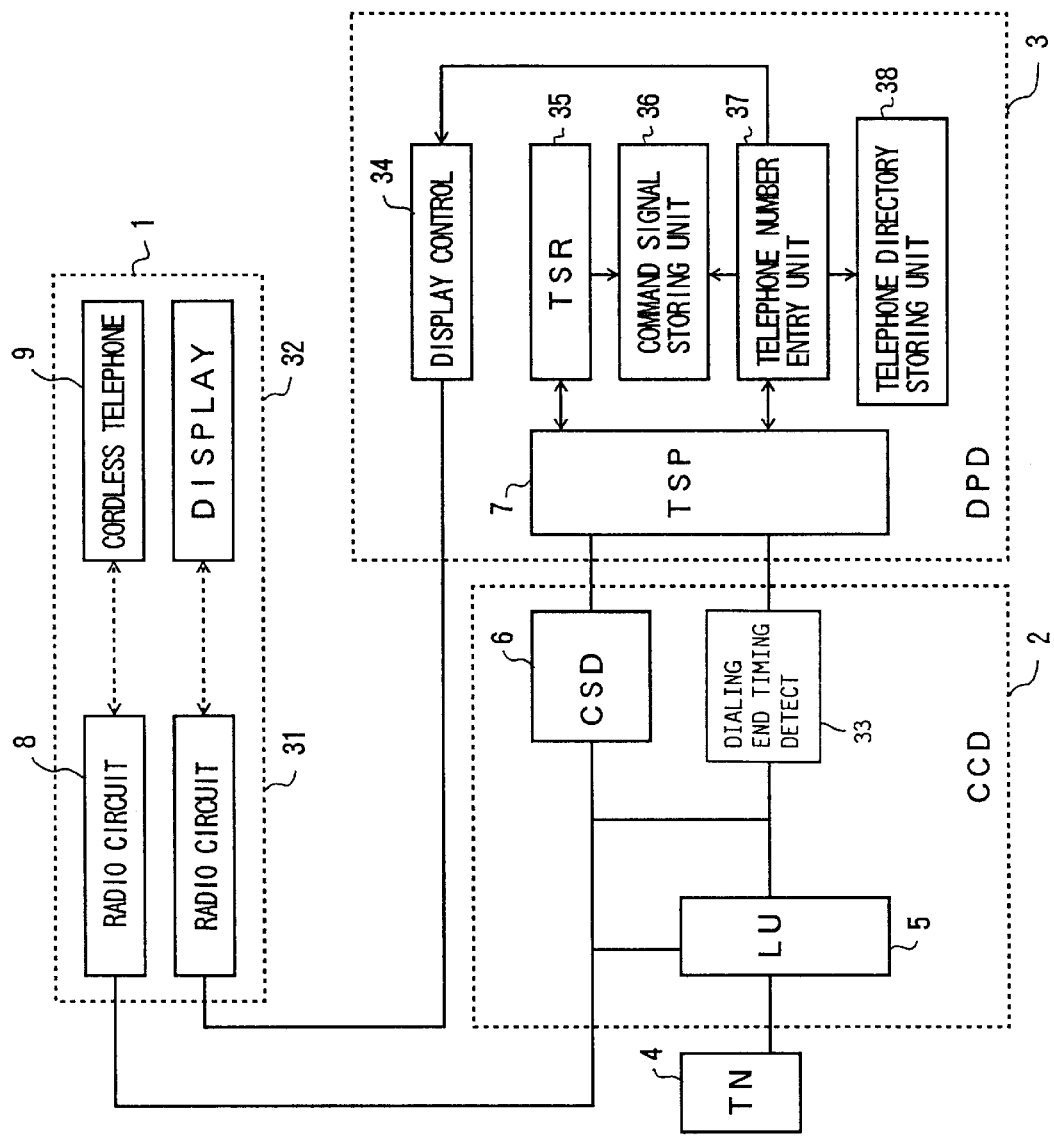
FIG. 6 is a block diagram of a telephone unit, a communication control device and a data processing device in the communication support system of the present invention.

FIG. 6 shows a telephone unit, a communication control device and a data processing device in the communication support system of the present invention.

Similar to the communication support system of FIG. 1, the communication support system of FIG. 6 generally has a telephone unit 1, a communication control device (CCD) 2, a data processing device (DPD) 3, and a telephone network (TN) 4. The telephone unit 1 is connected through the CCD 2 into the DPD 3, and the CCD 2 is connected to the TN 4. In FIG. 6, the elements which are the same as corresponding elements in FIG. 1 are designated by the same reference numerals, and a description thereof will be omitted.

In the communication support system of FIG. 6, the telephone unit 1 provides the existing voice transmission and reception functions and the existing dialing function. The telephone unit 1 of FIG. 6 comprises a radio circuit 8, a cordless telephone 9, a radio circuit 31, and a display 32. The cordless telephone 9 provides the existing radio signal transmission and reception function at a remote location of the radio circuit 8. The radio circuit 8 provides conversion of a radio signal from the cordless telephone 9 into voice data and conversion of voice data from the telephone line into a radio signal. The display 32 provides, for the telephone user of the telephone unit 1, a message sent by the DPD 3 when one of the telephone services such as the telephone number entry is provided. The radio circuit 31 provides conversion of a radio signal from the DPD 3 into display data in a format suitable for the display 32 to display the data. According to the present invention, the telephone unit 1 is not limited to the cordless telephone 9.

The communication control device (CCD) 2 of FIG. 6 comprises a line unit (LU) 5, a command signal detection unit (CSD) 6, and a dialing end timing detection unit 33. The LU 5 connects the telephone unit 1 to the telephone network 4, and connects the data processing device 3 to the telephone network 4. The communication control device (CCD) 2 provides connection of the telephone unit 1 to the telephone network 4 and connection of the data processing device 3 to the telephone network 4.

In the communication control device 2, the command signal detection unit (CSD) 6 provides detection of a DTMF command signal sent by the telephone unit 1. The DTMF command signal from the telephone unit 1 indicates one of the plurality of telephone services. The command signal detection unit (CSD) 6 detects the DTMF command signal sent by the telephone unit 1. The CCD 2 transmits the DTMF command signal from the telephone unit 1 and the control data from the CSD 6 to the data processing device (DPD) 3. The dialing end timing detection unit 33 provides detection of a dialing end timing based on a condition of a telephone line from the telephone unit 1.

In the communication support system of FIG. 6, the data processing device (DPD) 3 comprises a telephone service processing unit (TSP) 7, a display control unit 34, a telephone service recognition unit (TSR) 35, a command signal storing unit 36, a telephone number entry unit 37, and a telephone directory storing unit 38.

In the data processing device (DPD) 3, the TSR 35 determines which of the telephone services is indicated by the DTMF command signal from the telephone unit 1. The TSP 7 executes a telephone number entry processing for the telephone service determined by the TSR 35. The TSP 7 starts executing the telephone number entry processing in response to the control data from the CSD 6. The command signal storing unit 36 stores the DTMF command signal in the memory of the DPD 3.

Further, in the DPD 3, the TSP 7 controls the telephone number entry unit 37 so that the telephone number entry unit 37 executes the telephone number entry processing to register the input telephone number (related to the destination terminal) from the telephone unit 1 in a telephone directory of the memory. The TSP 7 controls the display control unit 34 when the dialing end timing is detected by the dialing end timing detection unit 33, so that the display control unit 34 generates a confirmation message and causes the display 32 to display the input telephone number and the confirmation message. The telephone directory storing unit 38 stores the telephone directory updated by the telephone number entry unit 37 in the memory.

Therefore, in the communication support system of FIG. 6, the data processing device (DPD) 3 provides the telephone service, such as the telephone number entry, based on the DTMF command signal sent by the telephone unit 1 when the telephone user uses the telephone unit 1 to remotely control the data processing device (DPD) 3. The communication support system of FIG. 6 allows the telephone user to more easily transmit data to or receive data from other communication media such as the data processing device. Further, the communication support system of FIG. 6 allows the telephone user to use the cordless telephone 9 in the telephone unit 1 to remotely control the data processing device (DPD) 3. It is no longer necessary that the user be located in front of the DPD 3 when obtaining the telephone number entry service from the communication support system.

In the communication support system of FIG. 6, when power is not supplied to the CCD 2, the line unit 5 connects the telephone unit 1 to the telephone network 4 and disconnects the command signal detection unit (CSD) 6 from the telephone unit 1. When power is supplied to the CCD 2, the line unit 5 connects the telephone unit 1 through the command signal detection unit (CSD) 6 into the DPD 3 and the telephone network 4. The CSD 6 detects the DTMF command signal sent by the telephone unit 1 when power is supplied to the CCD 2. When the DTMF command signal accords with one of the DTMF command signals of FIG. 2, the CCD 2 notifies the DPD 3 that an event has occurred due to the DTMF command signal. The CCD 2 transmits the command signal from the telephone unit 1 and the control data from the CSD 6 to the DPD 3.

In the DPD 3, the telephone service recognition unit (TSR) 35 determines which of the telephone services is indicated by the command signal from the telephone unit 1. The telephone service processing unit (TSP) 7 executes the telephone number entry processing for the telephone service determined by the TSR 35. The TSP 7 starts executing the telephone number entry processing in response to the control data from the CSD 6.

For example, when the DTMF command signal "*9" is sent by the telephone unit 1, the TSR 35 determines that the telephone number entry processing is indicated by the DTMF command signal. The TSP 7 executes the telephone number entry processing so that the telephone number entry unit 37 is controlled to start performing the telephone number entry processing. The command signal storing unit 36 stores the DTMF command signal in the memory. When the dialing end timing is detected by the dialing end timing detection unit 33 of the CCD 2, the telephone service processing unit 7 is notified by the dialing end timing detection unit 33 that the dialing by the telephone unit 1 is finished. The telephone number entry unit 37 is controlled to execute the telephone number entry processing.

The display control unit 34 is controlled to display the input telephone number and the confirmation message on the display 32 of the telephone unit 1. The confirmation message provokes the telephone user to decide whether the input telephone number is to be registered into the telephone directory of the DPD 3. When a user request for the telephone number entry is input by the telephone unit 1, the telephone number entry unit 37 is controlled to register the input telephone number into the telephone directory. The telephone directory storing unit 38 stores the telephone directory updated by the telephone number entry unit 37 in the memory.

The communication control device 2 in the communication support system of the present invention, as shown in FIGS. 1, 4, 5 and 6, may be considered a modem or a terminal adapter that connects both the telephone unit 1 and the data processing device 3 to the telephone network 4. FIG. 7 through FIG. 11 show various examples of construction of the elements of a conventional communication support system. In the examples of FIGS. 7–11, a modem, a telephone system with a built-in modem, and a personal computer with a built-in telephone and modem are used to construct the communication support system of the present invention.

Figure 7:
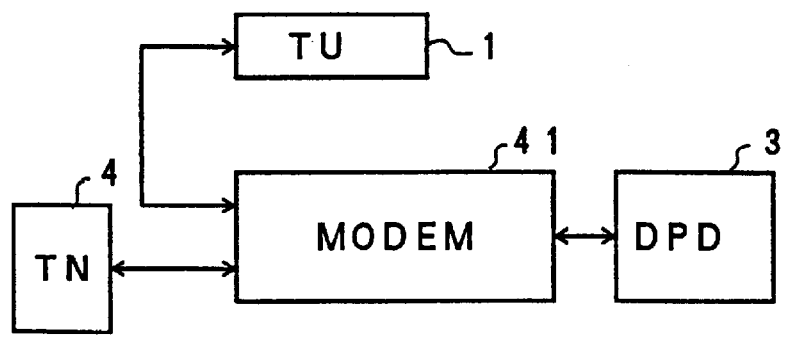
FIG. 7 is a diagram for explaining a construction of elements of the communication support system.
Figure 8:
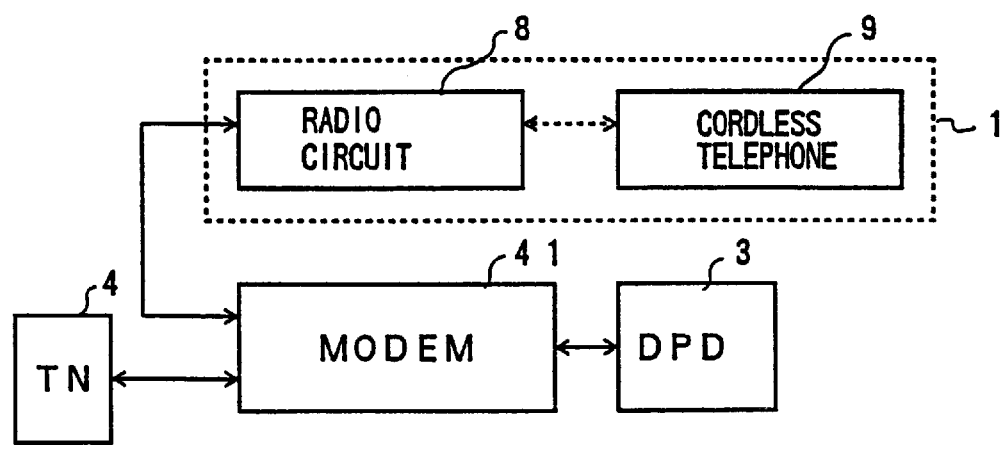
FIG. 8 is a diagram for explaining another construction of elements of the communication support system.

The examples of FIG. 7 and FIG. 8 are essentially the same as the construction of the elements of the communication support system shown in FIGS. 1, 4, 5, and 6. In the examples of FIG. 7 and FIG. 8, a modem 41 is substituted for the communication control device 2 in the communication support system of the present invention.

Figure 9:
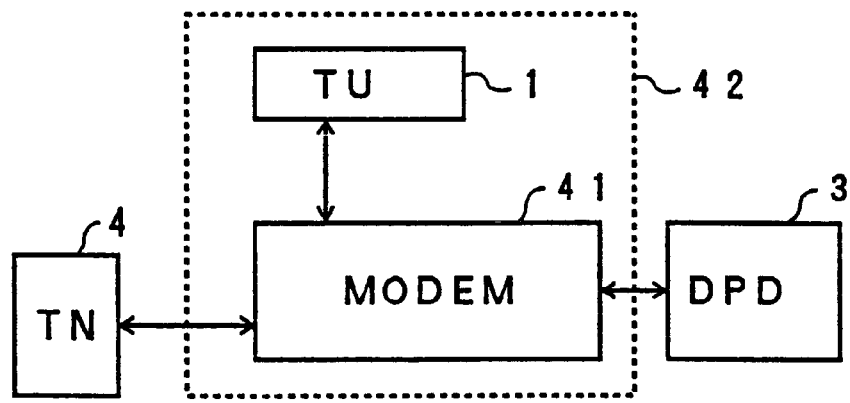
FIG. 9 is a diagram for explaining still another construction of elements of the communication support system.

The example of FIG. 9 utilizes a telephone system 42 having a built-in modem. In this example, the modem 41 contained in the telephone system 42 is substituted for the communication control device 2 in the communication support system of the present invention.

Figure 10:
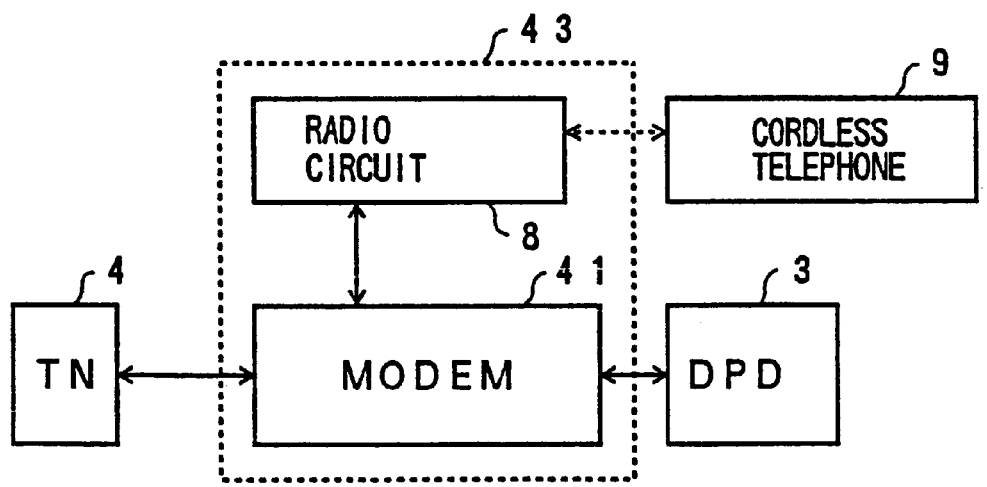
FIG. 10 is a diagram for explaining a further construction of elements of the communication support system.

The example of FIG. 10 utilizes a telephone system 43 having a built-in modem. In this example, the modem 41 contained in the telephone system 43 is substituted for the communication control device 2 in the communication support system of the present invention.

Figure 11:
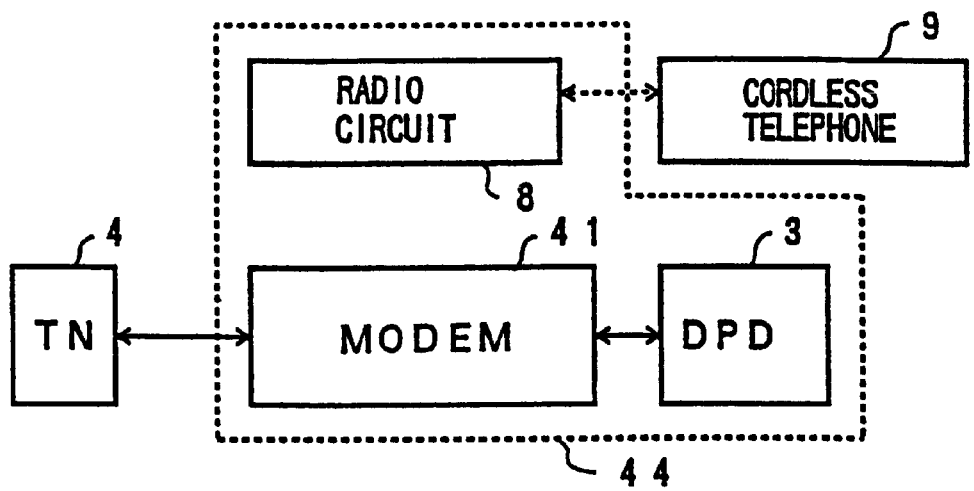
FIG. 11 is a diagram for explaining another construction of elements of the communication support system.

The example of FIG. 11 utilizes a personal computer 44 having a built-in telephone and modem. In this example, the modem 41 and the data processing device 3 contained in the personal computer 44 are substituted for the communication control device 2 and the data processing device 3 in the communication support system of the present invention.

Figure 12:
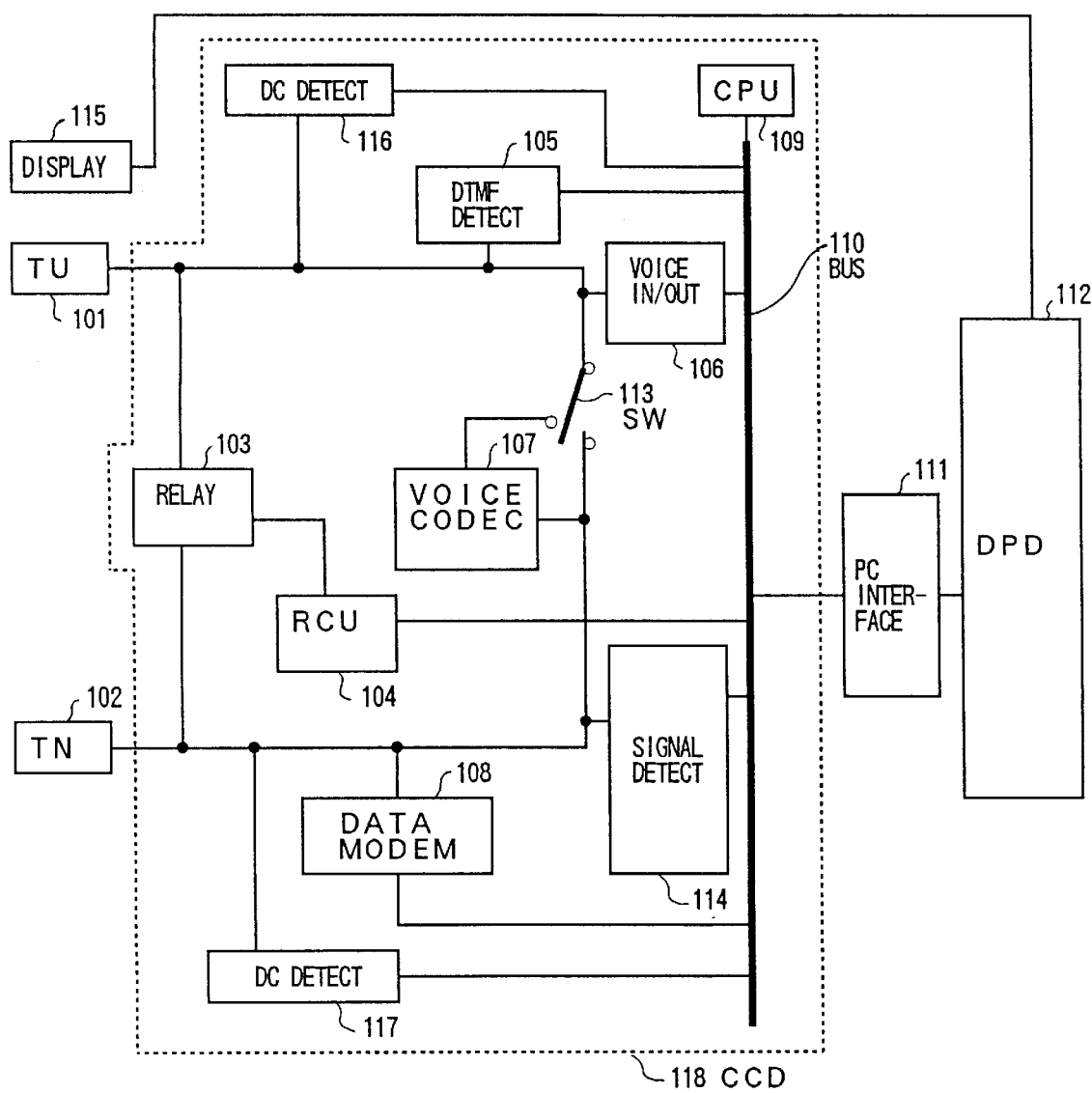
FIG. 12 is a block diagram of one embodiment of the communication control device in the communication support system.

Next, FIG. 12 shows one embodiment of the communication control device in the communication support system of the present invention.

In the present embodiment, one of the telephone services, including the voice recording and playback, file transmission and telephone number entry, is provided when the user on the telephone unit remotely controls the data processing device by transmitting a DTMF command signal from the telephone unit to the data processing device via the communication control device.

As shown in FIG. 12, the communication support system generally has a telephone unit (TU) 101, a communication control device (CCD) 118, a data processing device (DPD) 112, and a telephone network (TN) 102. The TU 101 is connected through the CCD 118 into the DPD 112, and the CCD 118 is connected to the TN 102. A PC interface unit 111 is provided between the CCD 118 and the DPD 112.

The CCD 118 in the present embodiment comprises a relay 103, a relay control unit (RCU) 104, a DTMF detection unit 105, a voice input/output unit (VOICE IN/OUT) 106, a voice coding/decoding unit (VOICE CODEC) 107, a data modulator/demodulator unit (DATA MODEM) 108, a central processing unit (CPU) 109, and a bus 110. The CCD 118 further comprises a switch (SW) 113, a signal detection unit (SIGNAL DETECT) 114, a direct-current detection unit (DC DETECT) 116, and a direct-current detection unit (DC DETECT) 117. A display 115 is provided at a location of the telephone unit 101 and connected to the DPD 112.

In the above-described communication support system, the execution of one of the telephone services, including voice recording and playback, file transmission and telephone number entry, is requested to the DPD 112 by the CCD 118 based on a corresponding one of a plurality of DTMF command signals sent from the telephone unit 101.

The TU 101 provides the existing voice signal transmission and receiving functions and the existing dialing function. The TN 102 is, for example, a public switched telephone network.

The CPU 109 receives signals from the elements of the CCD 118 connected through the bus 110, and controls these elements of the CCD 118. The DC detection unit 116 provides detection of an on-hook state of the TU 101. The DC detection unit 117 provides detection of a disconnection of the CCD 118 from the TN 102.

In the CCD 118 of the present embodiment, a telephone-service processing program related to the flowcharts of FIGS. 14–25 (which will be described later) is program code instructions stored in a memory (not shown) of the CCD 118. The memory of the CCD 118 is, for example, a ROM (read-only memory). The memory corresponds to a processor readable medium in the claims. The processor readable medium includes any one of instruction storage devices, such as, for example, magnetic disks including floppy disks, optical disks including CD-ROMs, magneto-optical disks including MOs, semiconductor memory cards such as PC cards and miniature cards, and other types of computer usable devices and media.

Further, in the present embodiment, the memory of the CCD 118 may store encoded or non-encoded instructions. The instructions may be installed from a floppy disk (or a CD-ROM) to a hard disk drive (not shown) of the CCD 118 first, transferred to a RAM (not shown) of the CCD 118 and then read by the CPU 109. The memory of the CCD 118 may store either all or a part of the instructions related to the flowcharts of FIGS. 14–25.

The relay control unit (RCU) 104 controls the relay 103 under control of the CPU 109. The relay 103 switches on or off a connection line between the TU 101 and the TN 102 when the relay 103 is controlled by the RCU 104. In the present embodiment, when power is supplied to place the CCD 118 in an initial condition, the relay 103 is set in an off-state by the RCU 104 so that the TU 101 and the CCD 118 are disconnected from the TN 102. When a command from the CPU 109 is sent to the RCU 104, or when power is not supplied to the CCD 118, the relay 103 is set in an on-state by the RCU 104 so that the TU 101 is connected through the CCD 118 into the TN 102.

The DTMF detection unit 105 provides detection of a DTMF command signal sent by the TU 101. The voice input/output unit 106 provides, to the DPD 112, a voice signal on the connection line between the TU 101 and the TN 102. The voice codec 107 provides coding of a voice signal from the TU 101 into transmission data, and provides decoding of transmission data from the TN 101 into a voice signal for the TU 101. The data modem 108 provides modulation and demodulation of transmission data in the CCD 118.

The PC interface unit 111 provides a personal-computer interface to connect the CCD 118 and the DPD 112. The DPD 112 provides execution of the telephone-service application program in order to provide the telephone services.

The switch 113 switches on and off a connection line of the voice codec 107 and the CCD 118. The switch 113 normally switches off the connection line of the voice codec 107 and the CCD 118 to disconnect the voice codec 107 from the TN 102. When one of the telephone services is provided by the DPD 112, the switch 113 switches on the connection line of the voice codec 107 and the CCD 118 so that the voice codec 107 provides coding and decoding of voice data in the CCD 118.

The signal detection unit 114 provides detections of various signals sent from or to the telephone line (the TU 101 and the TN 102), the signals including a busy-tone signal ("BUSY"), a ring tone signal ("RING"), a ring-back-tone signal ("RBT"), an on-hook signal ("ON-HOOK"), and an off-hook signal ("OFF-HOOK").

The display 115 provides, for the telephone user of the telephone unit 101, a message sent by the DPD 112 when one of the telephone services such as the telephone number entry is provided by the DPD 112.

Figure 13:
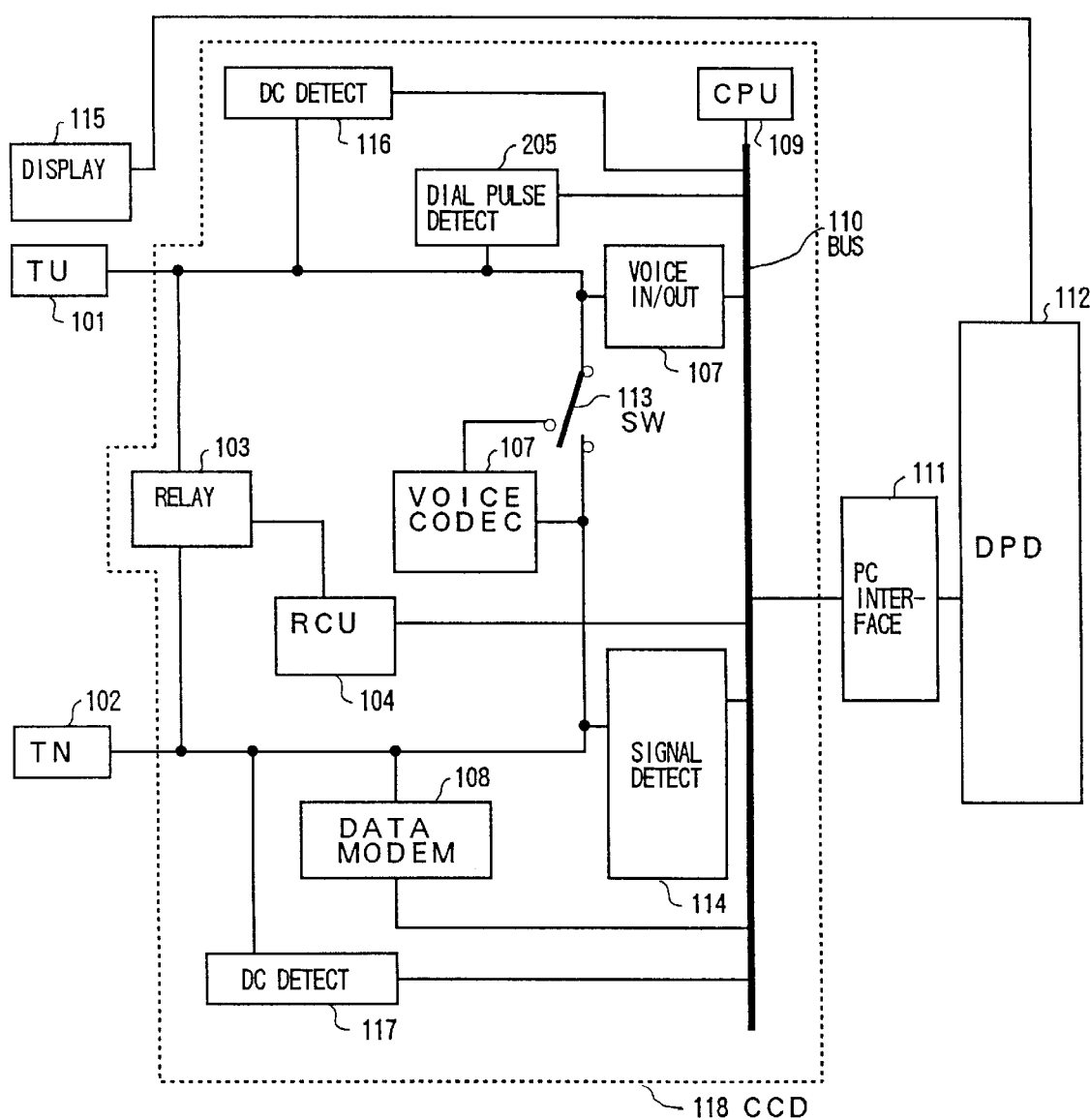
FIG. 13 is a block diagram of another embodiment of the communication control device in the communication support system.

FIG. 13 shows another embodiment of the communication control device in the communication support system of the present invention. In FIG. 13, the elements which are the same as corresponding elements in FIG. 12 are designated by the same reference numerals, and a description thereof will be omitted.

In the present embodiment, one of the plurality of dial-pulse command signals is sent to the CCD 118 by the telephone unit 101, instead of the DTMF command signal, and a dial-pulse detection unit 205 is substituted for the DTMF detection unit 105 in the communication support system. The dial pulse detection unit 205 detects one of the plurality of dial-pulse command signals sent by the telephone unit 101.

In the embodiment of FIG. 13, one of the telephone services, including voice recording and playback, file transmission and telephone number entry, is provided in the same manner as in the embodiment of FIG. 12, when the user on the telephone unit remotely requests the data processing device to provide a corresponding telephone service by transmitting a dial-pulse command signal to the data processing device.

Further, in the case of the frequency-based command signals shown in FIG. 3, a detection unit which detects one of the frequency-based command signals sent by the telephone unit 101 may be substituted for the DTMF detection unit 105 in the communication system of FIG. 12. Also, in such a case, one of the telephone services is provided in the same manner as in the embodiment of FIG. 12.

Figure 14:
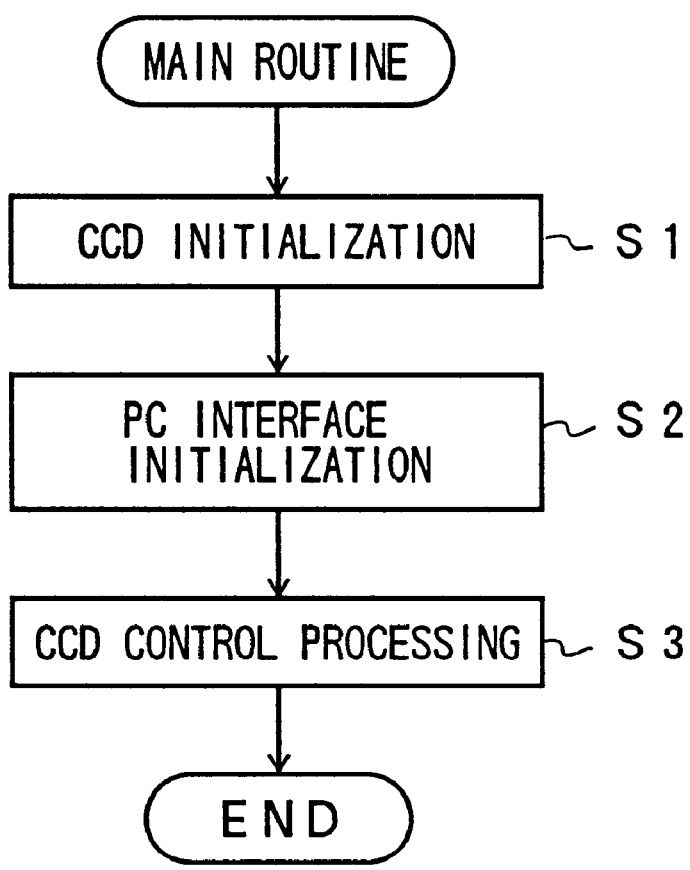
FIG. 14 is a flowchart for explaining a main routine of a telephone-service processing program executed by a central processing unit of the communication control device (CCD) of FIG. 12.
Figure 15:
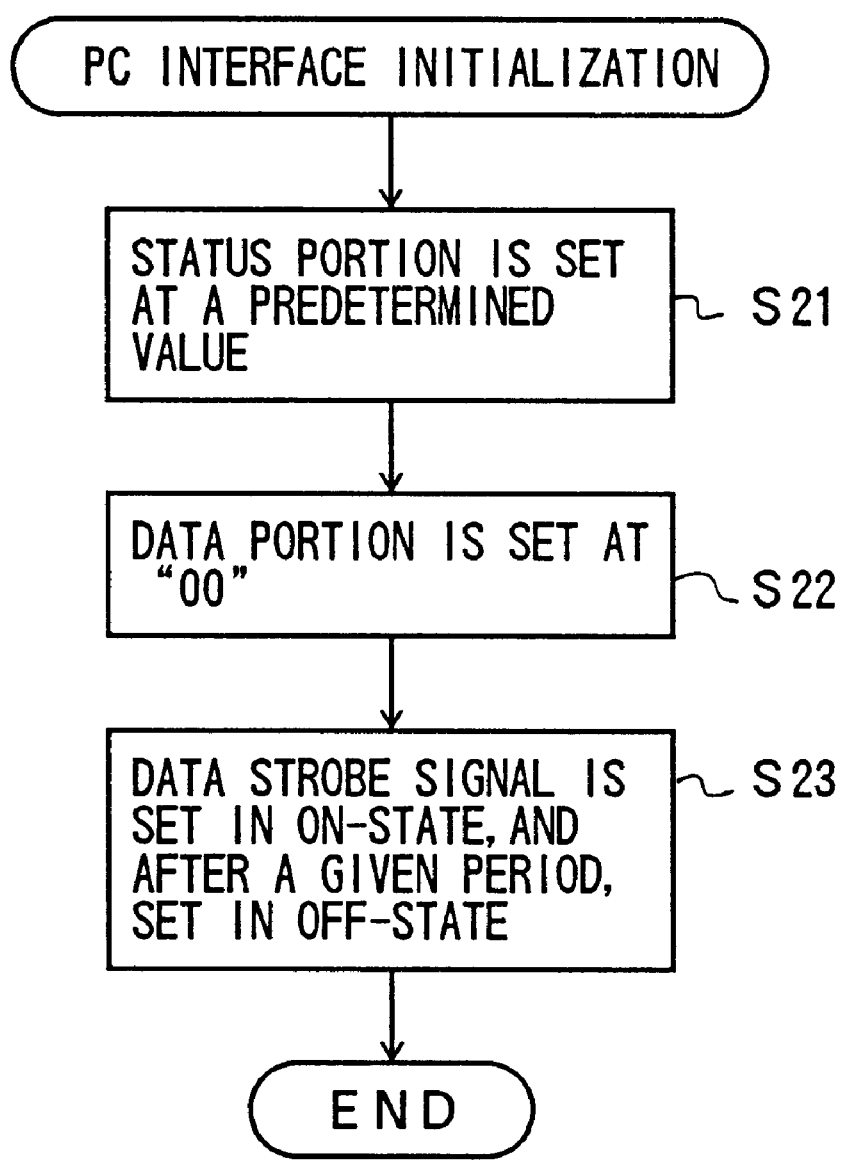
FIG. 15 is a flowchart for explaining a PC interface initialization in the main routine of FIG. 14.
Figure 16:
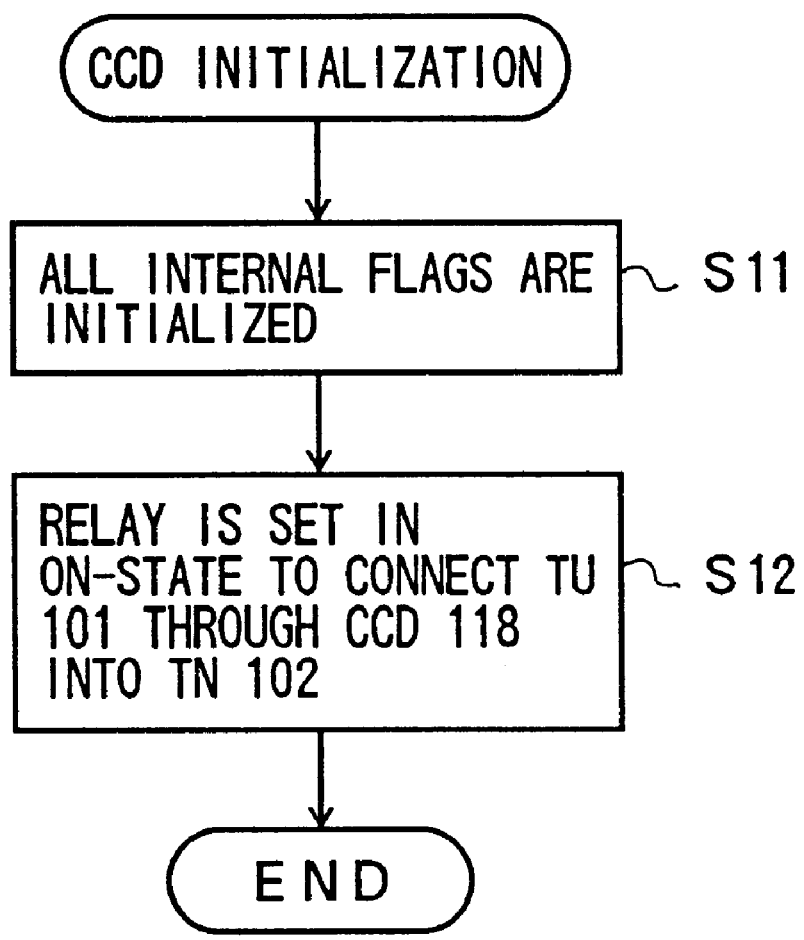
FIG. 16 is a flowchart for explaining a CCD initialization in the main routine of FIG. 14.

FIG. 14 shows a main routine of a telephone service processing program executed by the central processing unit (CPU) 109 of the communication control device (CCD) 118 of FIG. 12. FIG. 15 shows a PC interface initialization in the main routine of FIG. 14. FIG. 16 shows a CCD initialization in the main routine of FIG. 14.

As shown in FIG. 14, the program code instructions, stored in the memory of the CCD 118, cause the CPU 109 to perform an initialization of the CCD 118 (S1). After the CCD initialization of the above S1 is performed, the program code instructions cause the CPU 109 to perform an initialization of the PC interface unit 111 (S2). After the PC interface initialization of the above S2 is performed, the program code instructions cause the CPU 109 to perform a CCD control processing routine (S3) based on a signal sent by the TU 101, which will be described later.

In the CCD 118 shown in FIG. 12, it is assumed that power is supplied to the CCD 118 to place the CCD 118 in the initial condition, and the relay 103 is set in the off-state by the RCU 104 so that the TU 101 and the CCD 118 are disconnected from the TN 102.

As shown in FIG. 16, during the CCD initialization, the program code instructions cause the CPU 109 to initialize all internal flags of the CCD 118 (S11). After the initialization of the internal flags of the above S11 is performed, the program code instructions cause the CPU 109 to set the relay 103 in the on-state by controlling the RCU 104 (S12). In this case, the relay 103 switches on the connection line between the TU 101 and the TN 102 so that the TU 101 is connected through the CCD 118 into the TN 102. After the setting of the relay 103 of the above S12 is performed, the CCD initialization of FIG. 16 is finished.

As shown in FIG. 15, during the PC interface initialization, the program code instructions cause the CPU 109 to set a status portion of the memory of the CCD 118 at a predetermined value (S21). After the setting of the status portion of the above S21 is performed, the program code instructions cause the CPU 109 to set a data portion of the memory of the CCD 118 at "00" (S22). After the setting of the data portion of the above S22 is performed, the program code instructions cause the CPU 109 to set a data strobe signal in an on-state (S23). After a given time period, the program code instructions cause the CPU 109 to set the data strobe signal in an off-state (S23). In this case, setting the status portion at the predetermined value indicates that data is currently included in the data portion of the memory. After the setting of the data strobe signal of the above S23 is performed, the PC interface initialization of FIG. 15 is finished.

During the main routine of FIG. 14, the CPU 109 of the CCD 118 simultaneously executes an interrupt processing routine in response to an interrupt signal. In the communication support system of the present embodiment, the interrupt signal is supplied to the CPU 109 by either the DPD 112 or the CCD 118. In the CCD 118, the DTMF detection unit 105 or the signal detection unit 114 supplies a detection signal to the CPU 109 as the interrupt signal.

Figure 25:
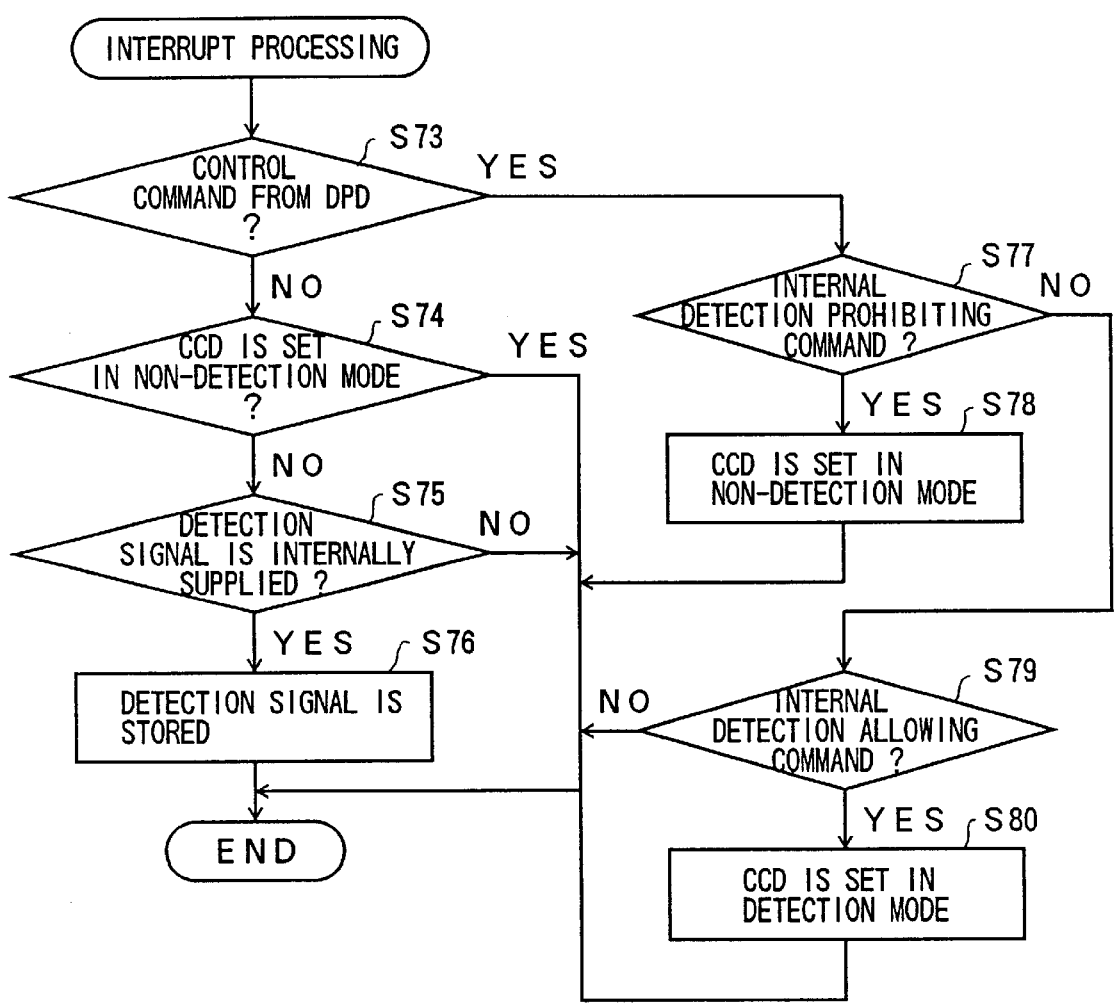
FIG. 25 is a flowchart for explaining an interrupt processing executed by the central processing unit of the communication control device (CCD) of FIG. 12.

FIG. 25 shows the interrupt processing routine executed by the CPU 109 of the CCD 118.

As shown in FIG. 25, when an interrupt signal is received by the CPU 109, the program code instructions cause the CPU 109 to determine whether the interrupt has occurred due to a control command sent by the DPD 112 (S73).

When the interrupt has occurred due to the control command from the DPD 112 (the result of the above S73 is affirmative), the program code instructions cause the CPU 109 to determine whether the control command sent by the DPD 112 is an internal detection prohibiting command (S77). When the result of the above S77 is affirmative, the program code instructions cause the CPU 109 to set the CCD 118 in a non-detection mode (S78). When the CCD 118 is set in the non-detection mode, the DTMF detection unit 105 and the signal detection unit 114 are prohibited from detecting the content of the signal sent by the TU 101. After the setting of the CCD 118 of the above S78 is performed, the interrupt processing routine of FIG. 25 is finished.

When the control command sent by the DPD 112 is not the internal detection prohibiting command (the result of the above S77 is negative), the program code instructions cause the CPU 118 to determine whether the control command is an internal detection allowing command (S79). When the result of the above S79 is affirmative, the program code instructions cause the CPU 109 to set the CCD 118 in a detection mode (S80). When the CCD 118 is set in the detection mode, the DTMF detection unit 105 and the signal detection unit 114 are allowed to detect the content of the signal sent by the TU 101. The CCD 118 is initially set in the detection mode. After the setting of the CCD 118 of the above S80 is performed, the interrupt processing routine of FIG. 25 is finished.

When the command signal is neither the internal detection prohibiting command nor the internal detection allowing command (both the results of the above S77 and S79 are negative), the interrupt processing routine of FIG. 25 is finished.

When the interrupt has occurred due to a signal other than the control command from the DPD 112 (the result of the above S73 is negative), the program code instructions cause the CPU 109 to detect whether the CCD 118 is set in the non-detection mode (S74). The CCD 118 is normally set in the detection mode, such that the result of the above S74 is negative. In such a case, the program code instructions cause the CPU 109 to detect whether a detection signal is internally supplied from the DTMF detection unit 105 or the signal detection unit 114 (S75).

When the result of the above S74 is affirmative, or when the result of the above S75 is negative, the interrupt processing routine of FIG. 25 is finished.

Figure 26:
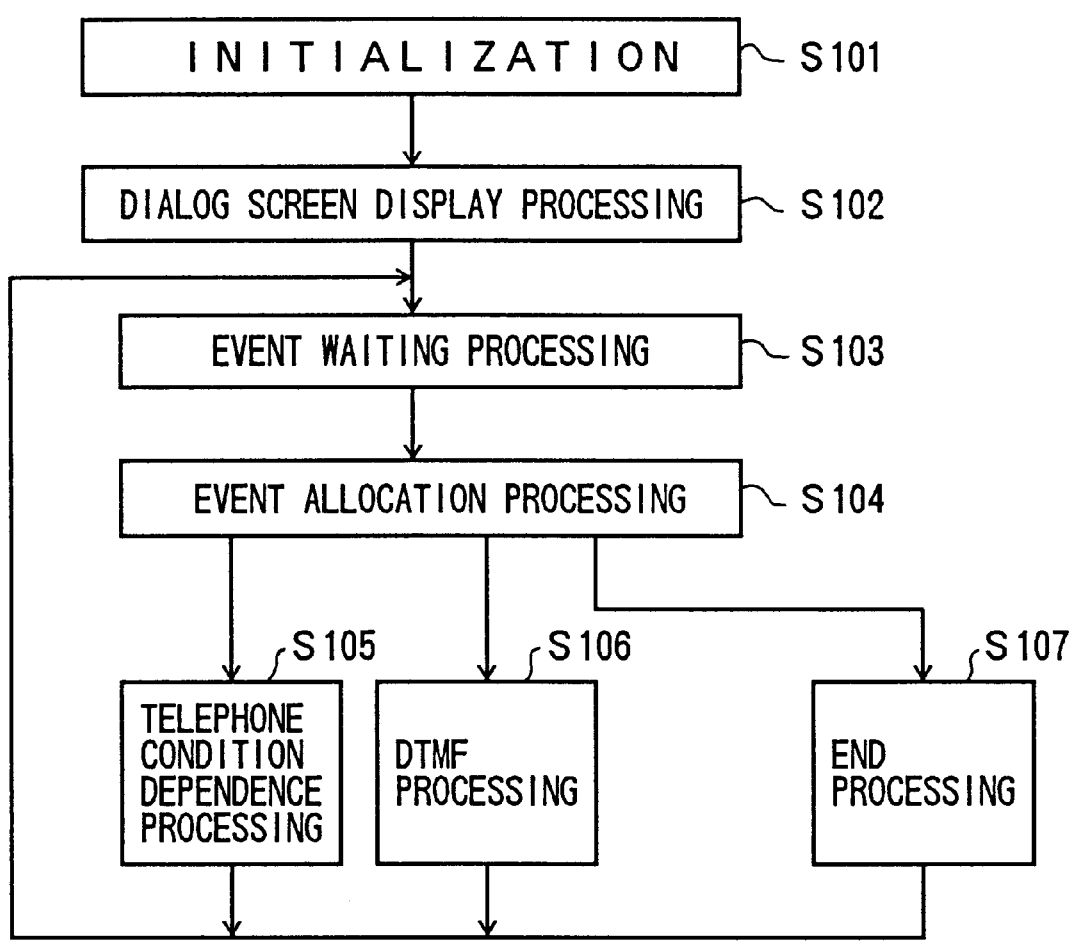
FIG. 26 is a flowchart for explaining a main routine of a telephone-service application program executed by a central processor of the data processing device in the communication support system.

When a detection signal is internally supplied from the DTMF detection unit 105 or the signal detection unit 114 (the result of the above S75 is affirmative), the program code instructions cause the CPU 109 to store the detection signal in the memory of the CCD 118 (S76). In this case, when one of the off-hook signal, the on-hook signal, the ring signal, the ring-back-tone signal and the busy-tone signal, which is sent by the TU 101, is detected by the signal detection unit 114, the detection signal is supplied to the CPU 109. Alternatively, when the DTMF command signal sent by the TU 101 is detected by the DTMF detection unit 105, the detection signal is supplied to the CPU 109. After the storing of the detection signal of the above S76 is performed, the interrupt processing routine of FIG. 26 is finished.

Figure 17:
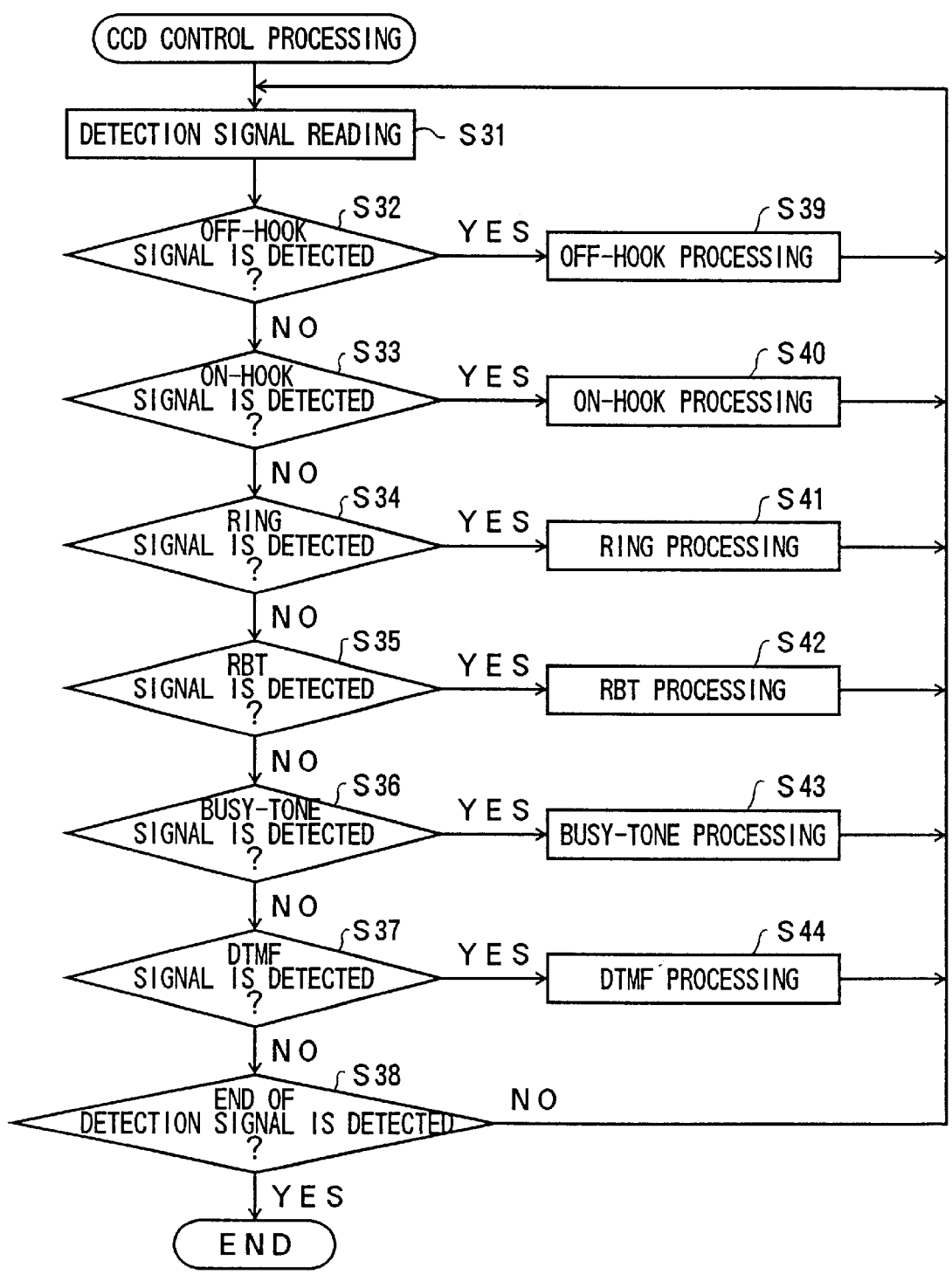
FIG. 17 is a flowchart for explaining a CCD control processing routine in the main routine of FIG. 14.

Next, FIG. 17 shows the CCD control processing routine S3 in the main routine of FIG. 14. As described above, after the PC interface initialization of FIG. 16 is performed, the program code instructions cause the CPU 109 to perform the CCD control processing routine S3 based on the signal sent by the TU 101.

As shown in FIG. 17, when the DTMF command signal from the TU 101 is detected by the DTMF detection unit 105 during the interrupt processing of FIG. 25, or when one of the off-hook signal, the on-hook signal, the ring signal, the ring-back-tone signal and the busy-tone signal, sent from the TU 101, is detected by the signal detection unit 114, the program code instructions cause the CPU 109 to perform a detection signal reading (S31).

Figure 24:
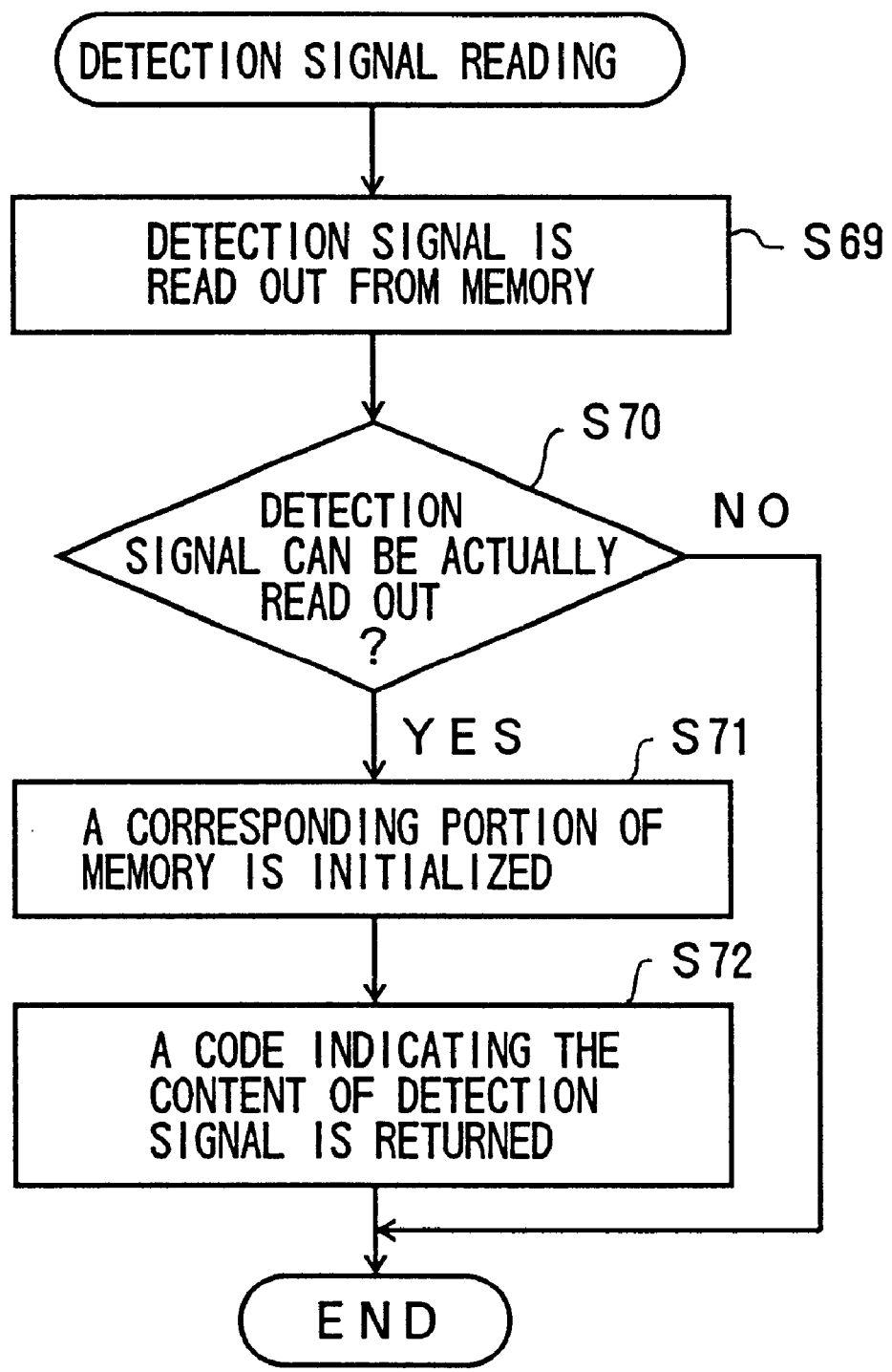
FIG. 24 is a flowchart for explaining a detection signal reading in the CCD control processing routine of FIG. 17.

FIG. 24 shows the detection signal reading S31 in the CCD control processing routine of FIG. 17.

As shown in FIG. 24, the program code instructions cause the CPU 109 to read out the detection signal (which has been stored in the above S76 in the interrupt processing of FIG. 25) from the memory of the CCD 118 (S69). After the reading of the detection signal of the above S69 is performed, the program code instructions cause the CPU 109 to determine whether the detection signal can be actually read out from the memory of the CCD 118 (S70). When the result of the above S70 is negative, the detection signal reading of FIG. 24 is finished.

When the result of the above S70 is affirmative, the program code instructions cause the CPU 109 to initialize a corresponding portion of the memory of the CCD 118 in which the detection signal was stored during the interrupt processing of FIG. 25 (S71). After the initialization of the above S71 is performed, the program code instructions cause the CPU 109 to return a code indicating the content of the detection signal read out in the above S69 (S72). After the returning of the code of the above S72 is performed, the detection signal reading of FIG. 24 is finished.

Referring back to FIG. 17, after the detection signal reading S31 is performed, the program code instructions cause the CPU 109 to determine which of the off-hook signal, the on-hook signal, the ring signal, the ring-back-tone ("RBT") signal, the busy-tone signal and the DTMF command signal is indicated by the return code obtained by the detection signal reading S31 (S32–S37 of FIG. 17).

As shown in FIG. 17, the program code instructions cause the CPU 109 to determine whether the off-hook signal is indicated by the return code (or detected by the signal detection unit 114) (S32). When the result of the above S32 is affirmative, the program code instructions cause the CPU 109 to perform an off-hook processing (S39).

Figure 18:
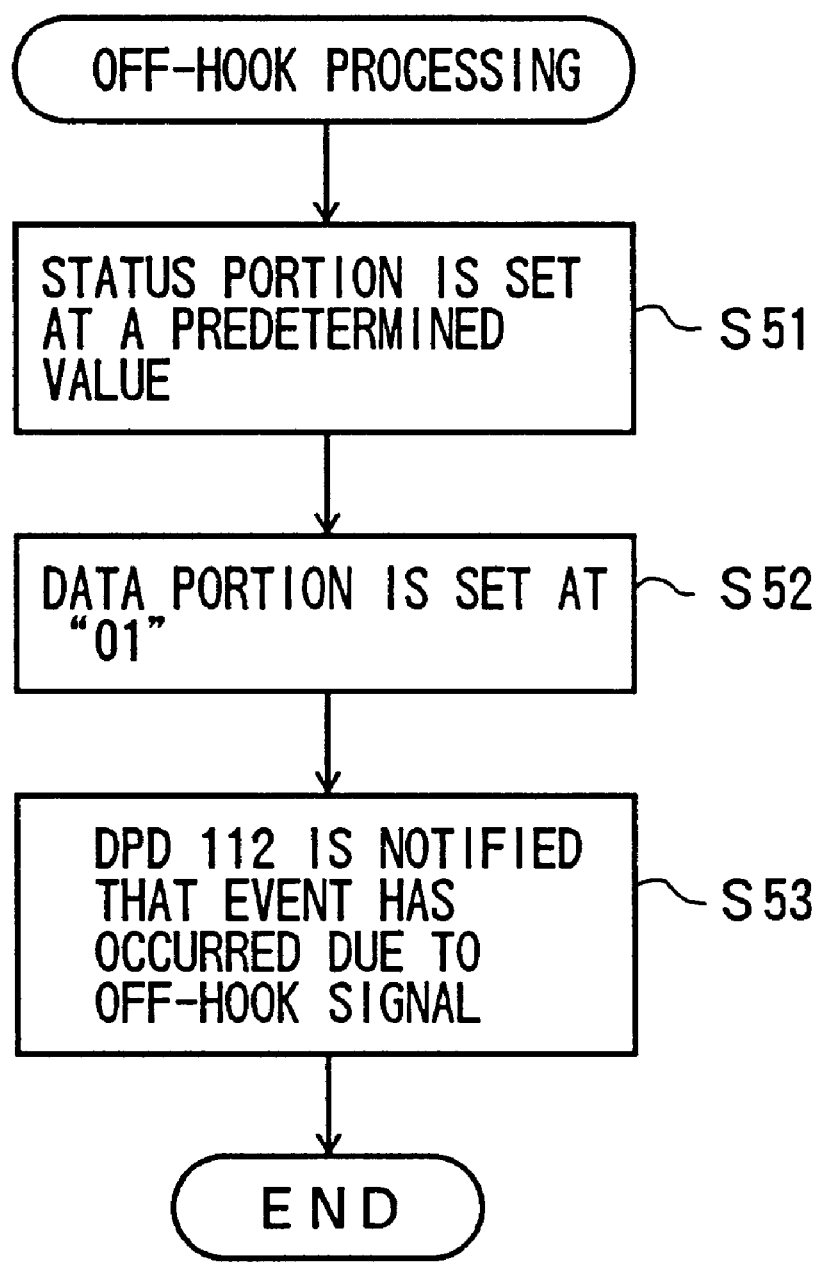
FIG. 18 is a flowchart for explaining an off-hook processing in the CCD control processing routine of FIG. 17.

FIG. 18 shows the off-hook processing S39 in the CCD control processing routine of FIG. 17.

As shown in FIG. 18, the program code instructions cause the CPU 109 to set the status portion of the memory of the CCD 118 at the predetermined value (S51). In this case, setting the status portion at the predetermined value indicates that data is currently included in the data portion of the memory. After the setting of the status portion of the above S51 is performed, the program code instructions cause the CPU 109 to set the data portion of the memory at "01" (S52). In this case, setting the data portion at "01" indicates that the off-hook signal is detected by the signal detection unit 114. After the setting of the data portion of the above S52 is performed, the program code instructions cause the CPU 109 to notify the DPD 112 that the event has occurred due to the off-hook signal from the TU 101 (S53). After the off-hook processing S39 is performed, the program code instructions cause the CPU 109 to again perform the above detection signal reading S31.

Referring back to FIG. 17, the program code instructions cause the CPU 109 to determine whether the on-hook signal is indicated by the return code (or detected by the signal detection unit 114) (S33). When the result of the above S33 is affirmative, the program code instructions cause the CPU 109 to perform an on-hook processing (S40).

Figure 19:
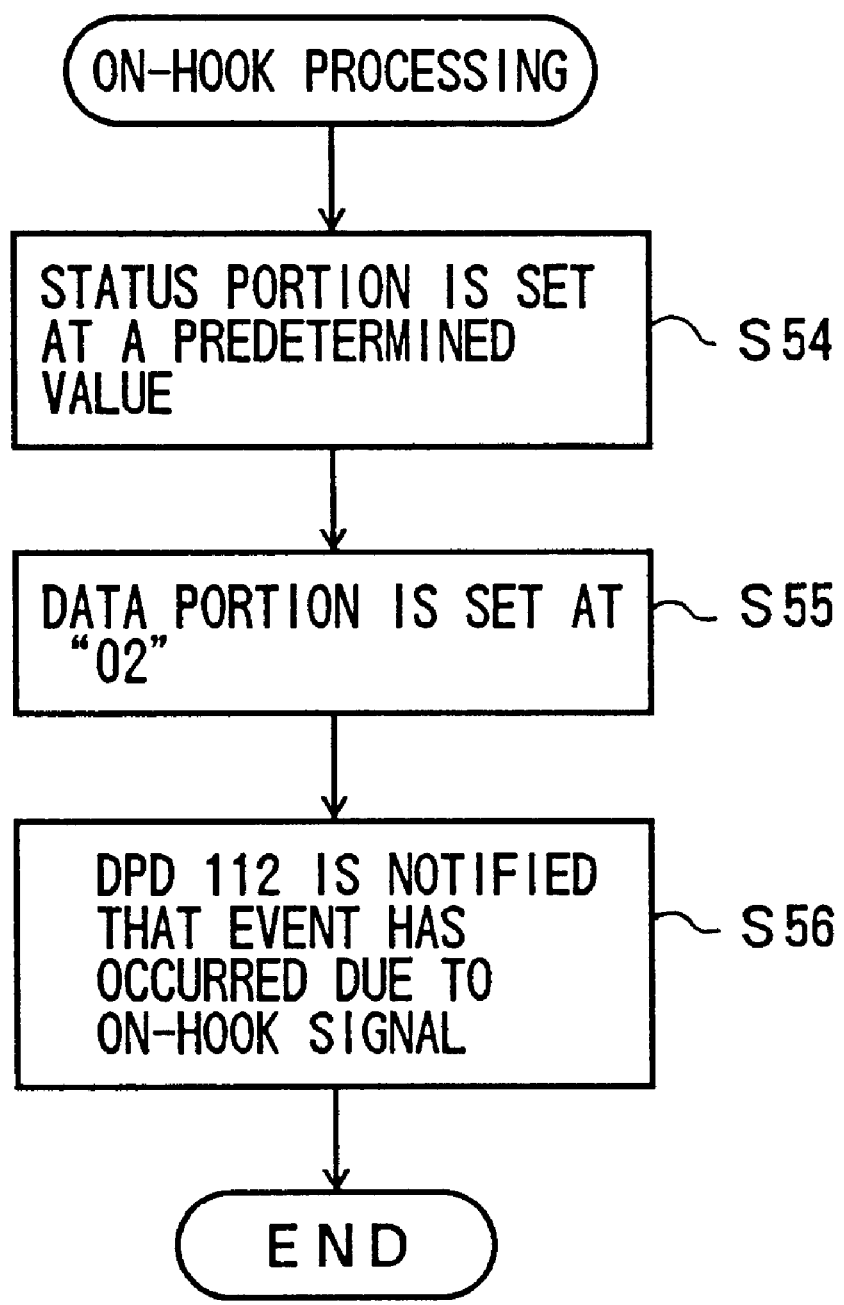
FIG. 19 is a flowchart for explaining an on-hook processing in the CCD control processing routine of FIG. 17.

FIG. 19 shows the on-hook processing S40 in the CCD control processing routine of FIG. 17.

As shown in FIG. 19, the program code instructions cause the CPU 109 to set the status portion of the memory of the CCD 118 at the predetermined value (S54). After the setting of the status portion of the above S51 is performed, the program code instructions cause the CPU 109 to set the data portion of the memory at "02" (S55). In this case, setting the data portion at "02" indicates that the on-hook signal is detected by the signal detection unit 114. After the setting of the data portion of the above S55 is performed, the program code instructions cause the CPU 109 to notify the DPD 112 that the event has occurred due to the on-hook signal from the TU 101 (S56). After the on-hook processing S40 is performed, the program code instructions cause the CPU 109 to again perform the above detection signal reading S31.

Referring back to FIG. 17, the program code instructions cause the CPU 109 to determine whether the ring signal is indicated by the return code (or detected by the signal detection unit 114) (S34). When the result of the above S34 is affirmative, the program code instructions cause the CPU 109 to perform a ring processing (S41).

Figure 20:
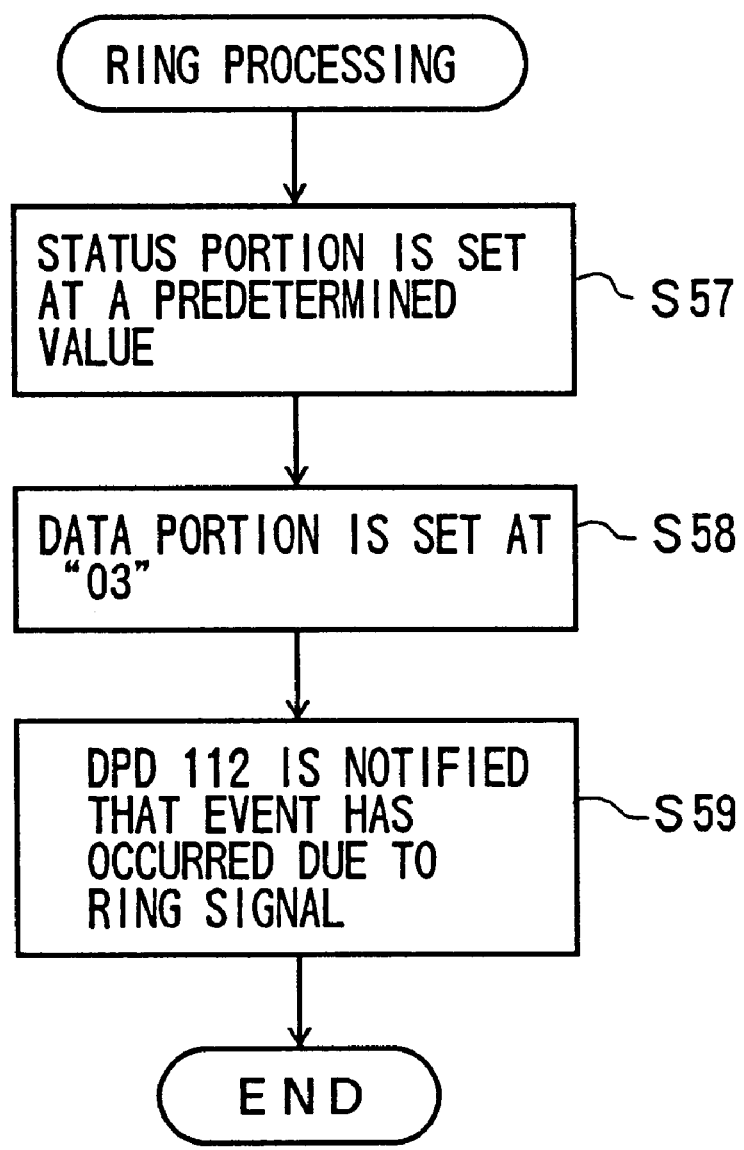
FIG. 20 is a flowchart for explaining a ring processing in the CCD control processing routine of FIG. 17.

FIG. 20 shows the ring processing S41 in the CCD control processing routine of FIG. 17.

As shown in FIG. 20, the program code instructions cause the CPU 109 to set the status portion of the memory of the CCD 118 at the predetermined value (S57). After the setting of the status portion of the above S57 is performed, the program code instructions cause the CPU 109 to set the data portion of the memory at "03" (S58). In this case, setting the data portion at "03" indicates that the ring signal is detected by the signal detection unit 114. After the setting of the data portion of the above S58 is performed, the program code instructions cause the CPU 109 to notify the DPD 112 that the event has occurred due to the ring signal from the TU 101 (S59). After the ring processing S41 is performed, the program code instructions cause the CPU 109 to again perform the above detection signal reading S31.

Referring back to FIG. 17, the program code instructions cause the CPU 109 to determine whether the ring-back-tone signal is indicated by the return code (or detected by the signal detection unit 114) (S35). When the result of the above S35 is affirmative, the program code instructions cause the CPU 109 to perform a ring-back-tone (RBT) processing (S42).

Figure 21:
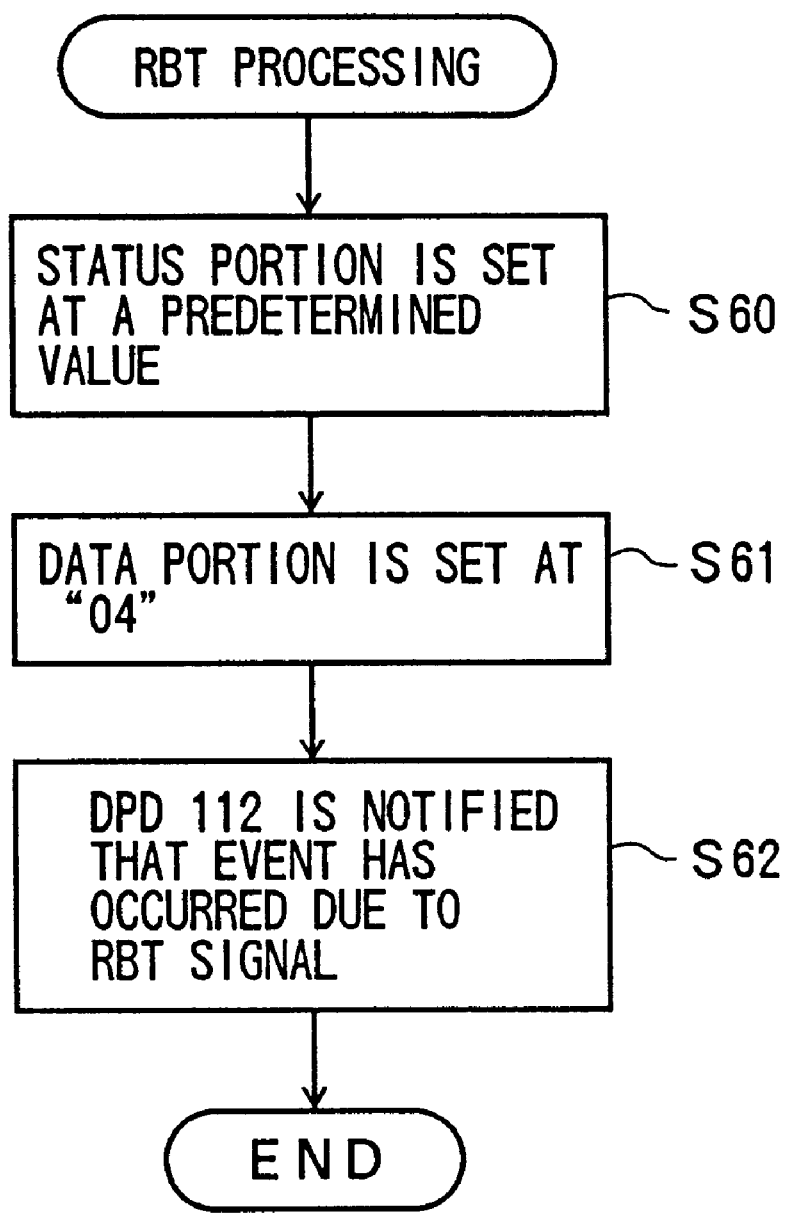
FIG. 21 is a flowchart for explaining a ring-back-tone processing in the CCD control processing routine of FIG. 17.

FIG. 21 shows the ring-back-tone (RBT) processing S42 in the CCD control processing routine of FIG. 17.

As shown in FIG. 21, the program code instructions cause the CPU 109 to set the status portion of the memory of the CCD 118 at the predetermined value (S60). After the setting of the status portion of the above S60 is performed, the program code instructions cause the CPU 109 to set the data portion of the memory at "04" (S61). In this case, setting the data portion at "04" indicates that the ring-back-tone signal is detected by the signal detection unit 114. After the setting of the data portion of the above S61 is performed, the program code instructions cause the CPU 109 to notify the DPD 112 that the event has occurred due to the ring-back-tone signal from the TU 101 (S62). After the RBT processing S42 is performed, the program code instructions cause the CPU 109 to again perform the above detection signal reading S31.

Referring back to FIG. 17, the program code instructions cause the CPU 109 to determine whether the busy-tone signal is indicated by the return code (or detected by the signal detection unit 114) (S36). When the result of the above S36 is affirmative, the program code instructions cause the CPU 109 to perform a busy-tone processing (S43).

Figure 23:
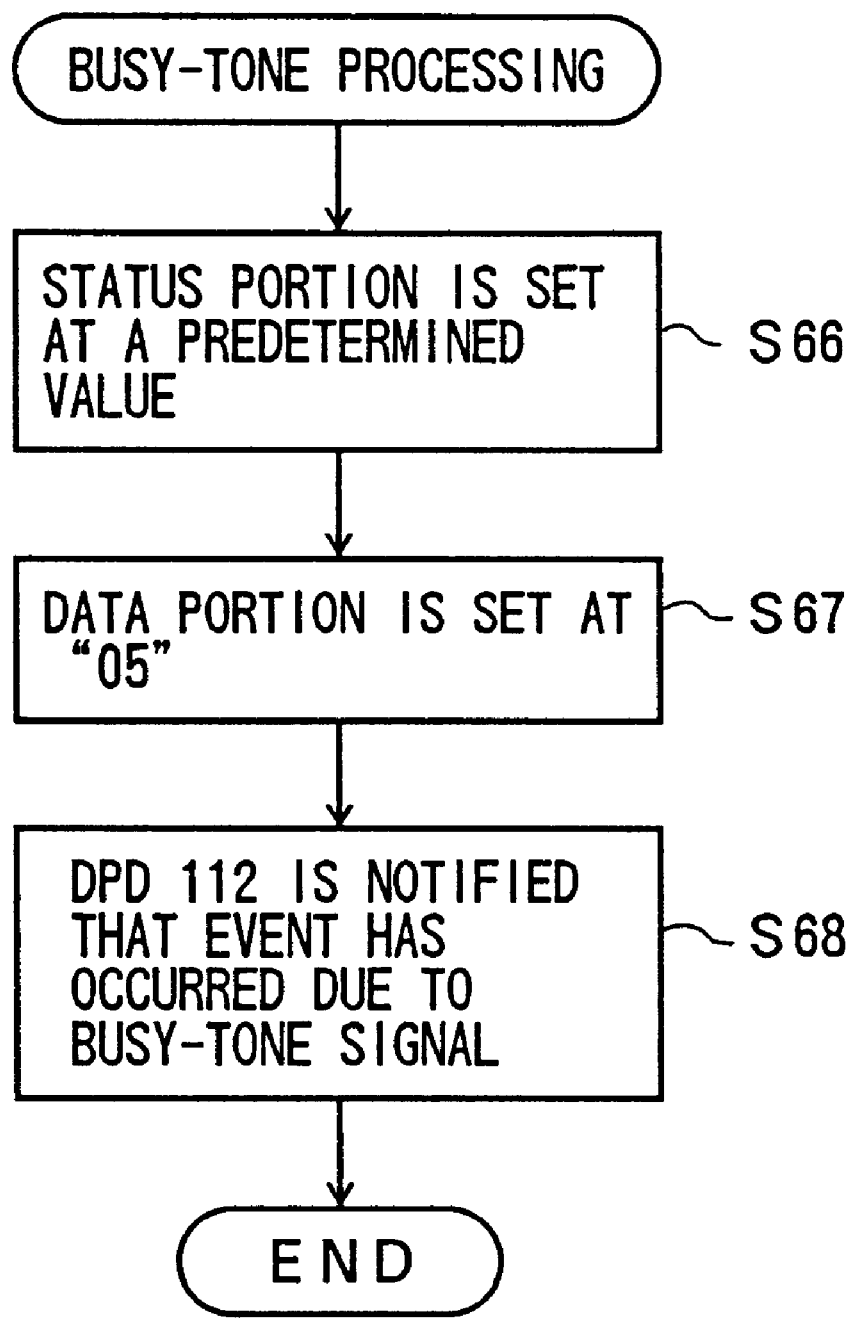
FIG. 23 is a flowchart for explaining a busy-tone processing in the CCD control processing routine of FIG. 17.

FIG. 23 shows the busy-tone processing S43 in the CCD control processing routine of FIG. 17.

As shown in FIG. 23, the program code instructions cause the CPU 109 to set the status portion of the memory of the CCD 118 at the predetermined value (S66). After the setting of the status portion of the above S66 is performed, the program code instructions cause the CPU 109 to set the data portion of the memory at "05" (S67). In this case, setting the data portion at "05" indicates that the busy-tone signal is detected by the signal detection unit 114. After the setting of the data portion of the above S67 is performed, the program code instructions cause the CPU 109 to notify the DPD 112 that the event has occurred due to the busy-tone signal from the TU 101 (S68). After the busy-tone processing S43 is performed, the program code instructions cause the CPU 109 to again perform the above detection signal reading S31.

Referring back to FIG. 17, the program code instructions cause the CPU 109 to determine whether the DTMF command signal is indicated by the return code (or detected by the DTMF detection unit 105) (S37). When the result of the above S37 is affirmative, the program code instructions cause the CPU 109 to perform a DTMF processing (S44).

Figure 22:
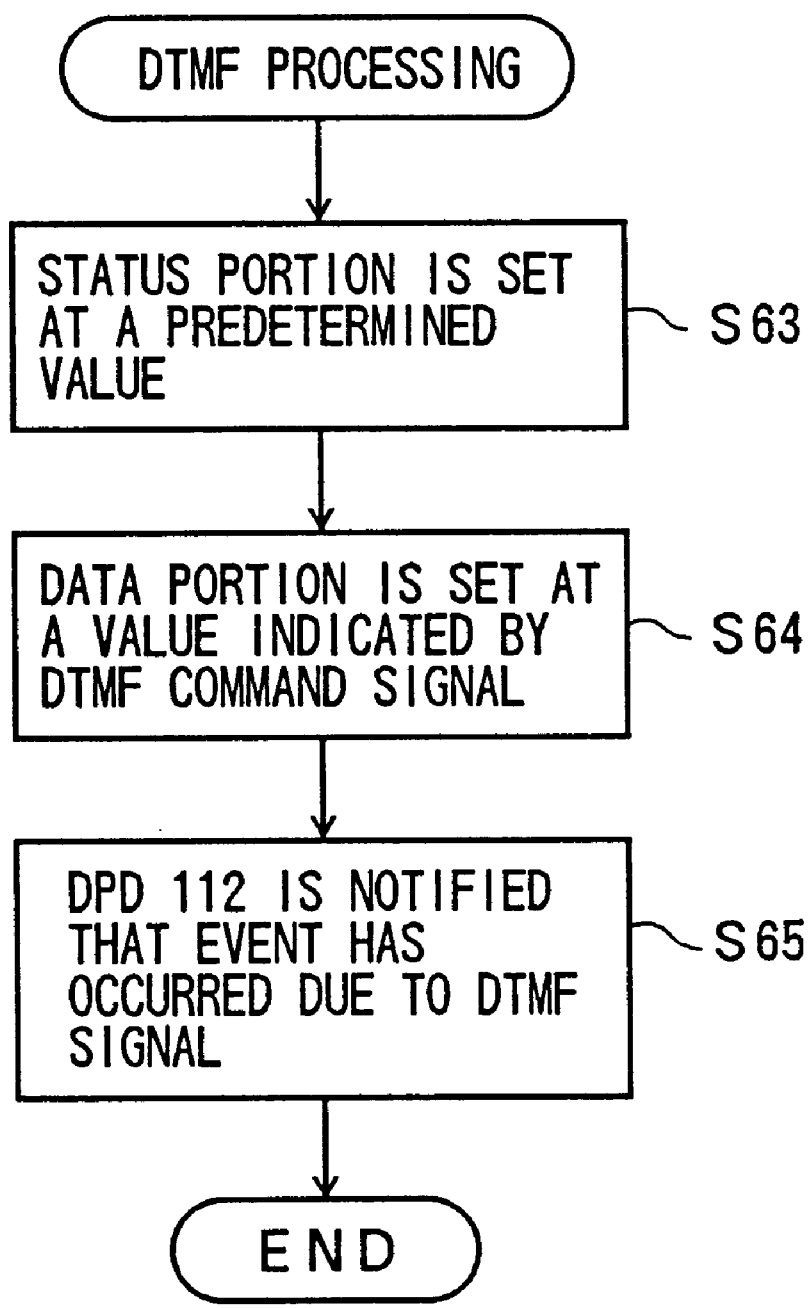
FIG. 22 is a flowchart for explaining a DTMF processing in the CCD control processing routine of FIG. 17.

FIG. 22 shows the DTMF processing S44 in the CCD control processing routine of FIG. 17.

As shown in FIG. 22, the program code instructions cause the CPU 109 to set the status portion of the memory of the CCD 118 at the predetermined value (S63). After the setting of the status portion of the above S63 is performed, the program code instructions cause the CPU 109 to set the data portion of the memory at a value indicated by the DTMF command signal (S64). The data portion of the memory is set at, for example, "*1" which is indicated by the DTMF command signal as shown in FIG. 2. In this case, setting the data portion at such a value indicates that the DTMF signal is detected by the DTMF detection unit 105. After the setting of the data portion of the above S64 is performed, the program code instructions cause the CPU 109 to notify the DPD 112 that the event has occurred due to the DTMF signal from the TU 101 (S65). After the DTMF processing S44 is performed, the program code instructions cause the CPU 109 to again perform the above detection signal reading S31.

Referring back to FIG. 17, the program code instructions cause the CPU 109 to determine whether the end of the detection signal is indicated by the return code (or no detection signal is detected by the signal detection unit 114 or the DTMF detection unit 105) (S38). When the result of the above S38 is affirmative, the CCD control processing routine of FIG. 17 is finished. When the result of the above S38 is negative, the program code instructions cause the CPU 109 to again perform the above detection signal reading S31.

Next, FIG. 26 shows a main routine of a telephone-service application program executed by a central processor of the data processing device 112 in the communication support system of the present invention.

The telephone-service application program related to the flowchart of FIG. 26 is program code instructions stored in a memory (not shown) of the data processing device (DPD) 112. The memory of the DPD 112 is, for example, a ROM (read-only memory). The memory of the DPD 112 corresponds to a processor readable medium in the claims. The processor readable medium includes any one of instruction storage devices, such as, for example, magnetic disks including floppy disks, optical disks including CD-ROMs, magneto-optical disks including MOs, semiconductor memory cards such as PC cards and miniature cards, and other types of computer usable devices and media.

Further, the memory of the DPD 112 may store encoded or non-encoded instructions. The instructions may be installed from a floppy disk (or a CD-ROM) to a hard disk drive (not shown) of the DPD 112 first, transferred to a RAM (not shown) of the DPD 112 and then read by the CPU of the DPD 112. The memory of the DPD 112 may store either all or a part of the instructions related to the flowchart of FIG. 26.

The telephone-service application program as shown in FIG. 26 is executed by the central processor (which will be simply called the processor) of the DPD 112 when, in the CCD control processing routine of FIG. 17, one of the off-hook signal, the on-hook signal, the ring signal, the ring-back-tone signal, the busy-tone signal and the DTMF command signal is detected and the DPD 112 is notified that such an event has occurred.

As shown in FIG. 26, the program code instructions cause the processor to perform an initialization of the telephone service application program in the DPD 112 (S101). In the initialization of the telephone-service application program, the voice recording/playback start/end processing, the file transmission start/end processing, and the telephone number entry processing, related to the DPD 112, are initialized.

After the initialization of the above S101 is performed, the program code instructions cause the processor to perform a dialog screen display processing related to the display 115 (S102).

After the dialog screen display processing of the above S102 is performed, the program code instructions cause the processor to perform an event waiting processing (S103). In the event waiting processing, the processor is placed in a waiting condition in which the processor awaits occurrence of an event by the CPU 109 of the CCD 118.

After the event waiting processing of the above S103 is performed, the program code instructions cause the processor to perform an event allocation processing (S104). As described above, one of the off-hook signal, the on-hook signal, the ring signal, the ring-back-tone signal, the busy-tone signal and the DTMF command signal is detected by the CPU 109 and the DPD 112 is notified by the CPU 109 that such an event has occurred, the processor of the DPD 112 allocates the event to one of a telephone condition dependence processing (S105), a DTMF processing (S106) and an end processing (S107). These processings S105–S107 are performed during the main routine of FIG. 26, and the processing corresponding to the related one of the telephone services is actually performed by the DPD 112.

When one of the off-hook signal, the on-hook signal, the ring signal, the ring-back-tone signal and the busy-tone signal is detected by the signal detection unit 114 of the CCD 118, the program code instructions cause the processor of the DPD 112 to perform the telephone condition dependence processing of the above S105. After the telephone condition dependence processing (S105) is performed, the program code instructions cause the processor to again perform the event waiting processing of the above S103.

When the DTMF command signal is detected by the DTMF detection unit 105 of the CCD 118, the program code instructions cause the processor of the DPD 112 to perform the DTMF processing of the above S106. After the DTMF processing (S106) is performed, the program code instructions cause the processor to again perform the event waiting processing of the above S103.

When a different event, other than the detection of one of the off-hook signal, the on-hook signal, the ring signal, the ring-back-tone signal, the busy-tone signal and the DTMF command signal, has occurred in the CCD 118, the program code instructions cause the processor to perform the end processing of the above S107. After the end processing (S107) is performed, the program code instructions cause the processor to again perform the event waiting processing of the above S103.

Figure 27:
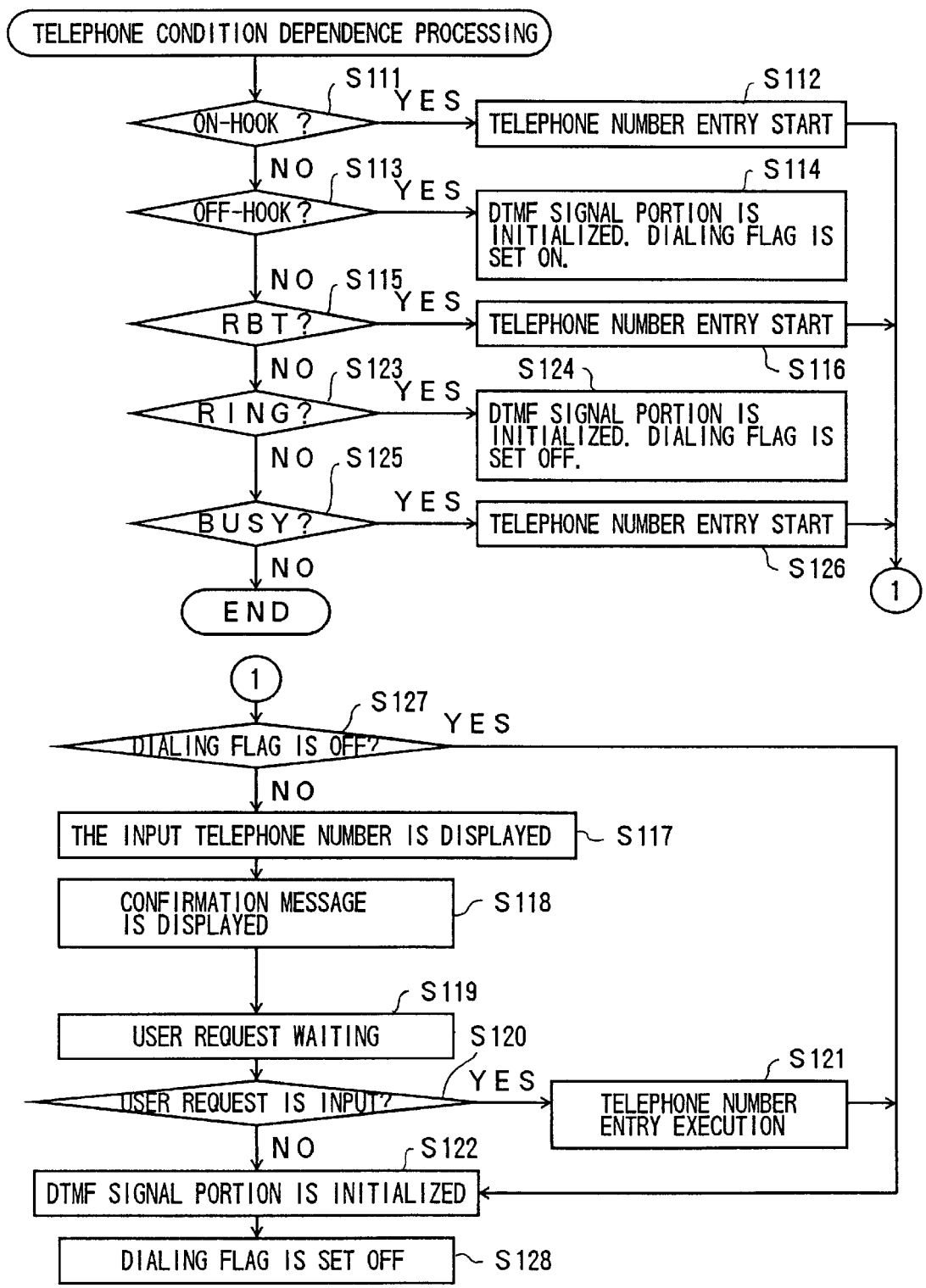
FIG. 27 is a flowchart for explaining a telephone condition dependence processing in the main routine of FIG. 26.

FIG. 27 shows the telephone condition dependence processing S105 in the main routine of FIG. 26.

As shown in FIG. 27, the program code instructions cause the processor to determine which of the on-hook signal ("ON-HOOK"), the off-hook signal ("OFF-HOOK"), the ring-back-tone signal ("RBT"), the ring signal ("RING") and the busy-tone signal ("BUSY") has been detected by the signal detection unit 114 of the CCD 118 (S111, S113, S115, S123 and S125). Further, the program code instructions cause the processor to perform a processing corresponding to the event which is notified to the DPD 112 by the CPU 109 of the CCD 118.

When it is notified to the DPD 112 that the event has occurred due to the on-hook signal from the TU 101 (the result of the above S111 is affirmative), the program code instructions cause the processor to start performing the telephone number entry processing (S112) which is related to one of the telephone services provided by the DPD 112.

During the telephone number entry processing, the program code instructions cause the processor to determine whether a dialing flag is set in an OFF state (S127). The dialing flag is normally set in an ON state when the dialing is being performed by the telephone user of the TU 101.

When the dialing flag is in the ON state (the result of the above S127 is negative), the program code instructions cause the processor of the DPD 112 to display a telephone number, currently input by the telephone user of the TU 101, on the display 115 (S117). Further, the program code instructions cause the processor to display a confirmation message on the display 115 (S118). The confirmation message provokes the telephone user to decide whether the input telephone number is to be registered into the telephone directory of the DPD 112.

After the confirmation message is displayed, the program code instructions cause the processor to be placed in a user request waiting condition (S119). During the user request waiting condition, the processor awaits inputting of a request for the telephone number entry by the telephone user. Further, the program code instructions cause the processor to determine whether the request for the telephone number entry is input by the telephone user (S120).

When the request for the telephone number entry is input by the telephone user (the result of the above S120 is affirmative), the program code instructions cause the processor to execute the telephone number entry processing (S121). In the telephone number entry processing, the input telephone number from the TU 101 is actually registered into the telephone directory of the DPD 112. After the telephone number entry processing of the above S121 is performed, the program code instructions cause the processor to initialize a DTMF signal portion of the memory (S122). Further, the program code instructions cause the processor to set the dialing flag in the OFF state (S128). Then, the telephone condition dependence processing of FIG. 27 is finished.

On the other hand, when the request for the telephone number entry is not input by the telephone user (the result of the above S120 is negative), or when the dialing flag is in the OFF state (the result of the above S127 is affirmative), the program code instructions cause the processor to perform the initialization of the DTMF signal portion of the memory of the above S122. In this case, the telephone number entry processing of the above S121 is not performed by the processor.

When the DPD 112 is notified that the event has occurred due to the off-hook signal from the TU 101 (the result of the above S113 is affirmative), the program code instructions cause the processor to initialize the DTMF signal portion of the memory and set the dialing flag in the ON state (S114).

When the DPD 112 is notified that the event has occurred due to the ring-back-tone signal from the TU 101 (the result of the above S115 is affirmative), the program code instructions cause the processor to start performing the telephone number entry processing (S116) in the same manner as in the above S112. Further, the program code instructions cause the processor to execute the above-described processing (the above S127, S117–S122 and S128).

When the DPD 112 is notified that the event has occurred due to the ring signal from the TU 101 (the result of the above S123 is affirmative), the program code instructions cause the processor to initialize the DTMF signal portion of the memory and set the dialing flag in the OFF state (S124).

When the DPD 112 is notified that the event has occurred due to the busy signal from the TU 101 (the result of the above S125 is affirmative), the program code instructions cause the processor to start performing the telephone number entry processing (S126) in the same manner as in the above S112. Further, the program code instructions cause the processor to execute the above-described processing (the above S127, S117–S122 and S128).

When the DPD 112 is notified that no event has occurred (all the results of the above S111, S113, S115, S123 and S125 are negative), the telephone condition dependence processing of FIG. 27 is finished. In this case, none of the above-described processing (the above S112, S114, S116, S124 and S126) is performed by the processor.

Figure 28:
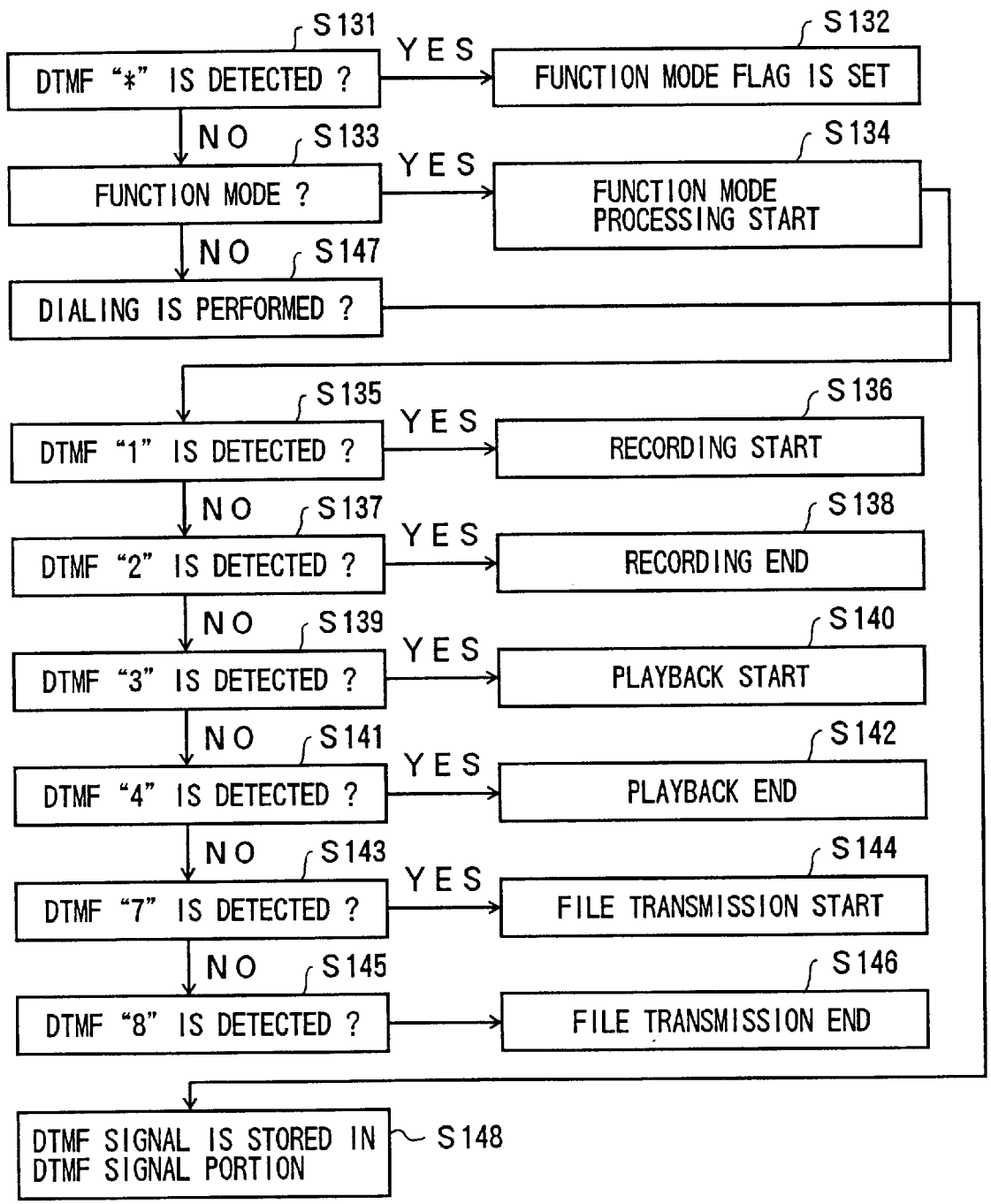
FIG. 28 is a flowchart for explaining a DTMF processing in the main routine of FIG. 26.
Figure 29:
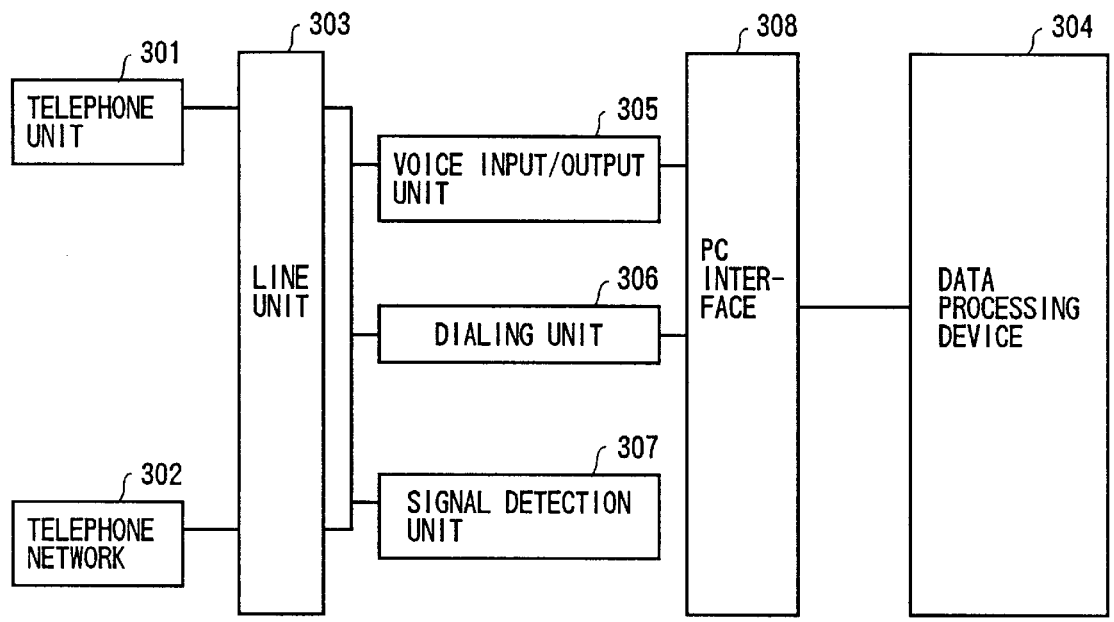
FIG. 29 is a block diagram of a conventional communication support system.

Next, FIG. 28 shows the DTMF processing S106 in the main routine of FIG. 26.

As described above, when the DTMF command signal from the TU 101 is detected by the DTMF detection unit 105 of the CCD 118, the program code instructions cause the processor of the DPD 112 to perform the DTMF processing S106 in the main routine of FIG. 26. In the DTMF processing, the processor carries out one of the telephone services including the recording/playback start/end processing and the file transmission start/end processing.

As shown in FIG. 28, the program code instructions cause the processor of the DPD 112 to determine whether the DTMF command signal detected by the DTMF detection unit 105 includes the DTMF "*" as a first portion thereof (S131). When the DTMF command signal includes the DTMF "*" as the first portion thereof (the result of the above S131 is affirmative), the program code instructions cause the processor to set a function mode flag in an ON state (S132). When the function mode flag is set in the ON state, the processor is placed in a function mode in which the processor awaits detection of a second portion of the DTMF command signal.

When the DTMF command signal does not include the DTMF "*" as the first portion thereof (the result of the above S131 is negative), the program code instructions cause the processor to determine whether the processor is placed in the function mode (S133). When the processor is not placed in the function mode (the result of the above S133 is negative), the program code instructions cause the processor to detect that the dialing is being performed by the telephone user of the TU 101 (S147). After the S147 is performed, the program code instructions cause the processor to store the DTMF command signal in the DTMF signal portion of the memory (S148).

On the other hand, when the processor is placed in the function mode (the result of the above S133 is affirmative), the program code instructions cause the processor to start a function mode processing (S134). During the function mode processing, the processor determines what code or number is indicated by the second portion of the DTMF command signal (S135, S137, S139, S141, S143 and S145). Further, the processor of the DPD 112 carries out the related one of the telephone services (S136, S138, S140, S142, S144 and S146) based on the content of the second portion of the DTMF command signal.

For example, when the DTMF command signal includes the DTMF "1" as the second portion thereof (S135), the program code instructions cause the processor to perform a recording start processing (S136) which is one of the telephone services provided by the DPD 112. When the DTMF command signal includes the DTMF "2" as the second portion thereof (S137), the program code instructions cause the processor to perform a recording end processing (S138) which is one of the telephone services provided by the DPD 112. When the DTMF command signal includes the DTMF "3" as the second portion thereof (S139), the program code instructions cause the processor to perform a playback start processing (S140) which is one of the telephone services provided by the DPD 112. When the DTMF command signal includes the DTMF "4" as the second portion thereof (S141), the program code instructions cause the processor to perform a playback end processing (S142) which is one of the telephone services provided by the DPD 112. When the DTMF command signal includes the DTMF "7" as the second portion thereof (S143), the program code instructions cause the processor to perform a file transmission start processing (S144) which is one of the telephone services provided by the DPD 112. When the DTMF command signal includes the DTMF "8" as the second portion thereof (S145), the program code instructions cause the processor to perform a file transmission end processing (S146) which is one of the telephone services provided by the DPD 112.

Further, the present invention is not limited to the above-described embodiments, and variations and modifications may be made without departing from the present invention.

What is claimed is:

1. A communication support system in which a telephone unit is connected through a communication control device into a data processing device, the communication control device being connected to a telephone network, comprising:
   a computer interface connecting the data processing device to the communication control device;
   a command signal detection unit, provided in the communication control device, to detect a command signal sent by the telephone unit, the command signal having a specified value allocated to one of a plurality of telephone services comprising file transmission start or file transmission end, wherein the command signal detection unit sends a notification to the data processing device via the computer interface that the command signal is detected;
   a line unit in the communication control device to determine whether power is supplied to the communication control device and to perform one of connecting the telephone unit to the telephone network and disconnecting the command signal detection unit from the telephone unit when power is not supplied to the communication control device and connecting the telephone unit through the command signal detection unit to the data processing device and the telephone network when power is supplied to the communication control device;
   a telephone service recognition unit, provided in the processing device, to determine which of the plurality of telephone services is indicated by the command signal from the telephone unit; and
   a telephone service processing unit, provided in the data processing device, to execute a telephone service processing for the telephone service determined by the telephone service recognition unit, the telephone service processing unit starting execution of the telephone service processing in response to the notification by the command signal detection unit, so that the one of the plurality of telephone services is remotely provided to the telephone unit.

2. The communication support system according to claim 1, wherein the data processing device comprises:
   a voice recording unit to execute a voice recording processing to record a voice signal on a connection line of the telephone unit and the telephone network when the voice recording unit is controlled by the telephone service processing unit;
   a voice data storing unit to store voice data, derived from the voice signal on the connection line, in a memory when the voice recording processing is executed by the voice recording unit; and
   a voice playback unit to execute a voice playback processing to reproduce the voice signal from the voice data stored in the memory, when the voice playback unit is controlled by the telephone service processing unit.

3. The communication support system according to claim 2, wherein the communication control device comprises a voice input/output unit to supply a voice signal sent from one of the telephone unit and the telephone network, to the data processing device, and to supply a voice signal derived from digital data stored in the data processing device, to one of the telephone unit and the telephone network.

4. The communication support system according to claim 1, wherein the data processing device comprises:
   a data receiving unit to receive transmission data when the data receiving unit is controlled by the telephone service processing unit;
   a data storing unit to store the transmission data received by the data receiving unit, in a memory; and
   a data transmitting unit to transmit the transmission data stored in the memory, when the data transmitting unit is controlled by the telephone service processing unit.

5. The communication support system according to claim 4, wherein the communication control device comprises:
   a voice coding/decoding unit; and
   a switch to selectively switch on and off a connection line of the voice coding/decoding unit and the communication control device, the switch switching off the connection line to disconnect the voice coding/decoding unit from the telephone network when none of the telephone services is provided by the data processing device, and when one of the telephone services is provided by the data processing device, the switch switching on the connection line to connect the voice coding/decoding unit to the telephone network.

6. The communication support system according to claim 1, wherein the data processing device comprises:
   a telephone number entry unit to execute a telephone number entry processing to register an input telephone number from the telephone unit in a telephone directory of a memory when the telephone number entry unit is controlled by the telephone service processing unit; and
   a telephone directory storing unit to store the telephone directory updated by the telephone number entry unit in the memory.

7. The communication support system according to claim 6, wherein the telephone unit includes a display connected to the data processing device, said communication support system further comprising:
   a dialing end timing detection unit to detect a dialing end timing based on a condition of a telephone line from the telephone unit; and a display control unit to generate a confirmation message and causing the display of the telephone unit to display the input telephone number and the confirmation message thereon when the dialing end timing is detected by the dialing end timing detection unit.

8. The communication support system according to claim 1, wherein the command signal detection unit detects one of a dual-tone multiple frequency command signal, a dial-pulse command signal and a frequency-based command signal as the command signal sent by the telephone unit.

9. The communication support system according to claim 1, wherein the telephone service processing unit executes one of a voice recording processing, a voice playback processing, a file transmission processing and a telephone number entry processing based on the telephone service determined by the telephone service recognition unit.

10. A communication control device for a communication support system including a telephone unit and a data processing device wherein the communication control device is connected to a telephone network and the telephone unit sends a command signal indicating one of a plurality of telephone services, comprising:

a line unit to connect the telephone unit through the communication control device into the data processing device and the telephone network, to determine whether power is supplied to the communication control device, and to perform one of connecting the telephone unit to the telephone network and disconnecting the command signal detection unit from the telephone unit when power is not supplied to the communication control device and connecting the telephone unit through the command signal detection unit to the data processing device and the telephone network when power is supplied to the communication control device; and a command signal detection unit to detect the command signal sent by the telephone unit, the command signal having a specified value allocated to one of a plurality of telephone services comprising file transmission start or file transmission end, wherein the command signal detection unit sends a notification to the data processing device via a computer interface that the command signal is detected, so that the data processing device starts execution of a telephone service processing for the one of the plurality of telephone services in response to the notification by the command signal detection unit, so that the one of the plurality of telephone services is remotely provided to the telephone unit.

11. The communication control device according to claim 10, further comprising a voice input/output unit to supply a voice signal sent from one of the telephone unit and the telephone network, to the data processing device, and to supply a voice signal derived from digital data stored in the data processing device, to one of the telephone unit and the telephone network.

12. The communication control device according to claim 10, further comprising:

a voice coding/decoding unit; and a switch to selectively switch on and off a connection line of the voice coding/decoding unit and the communication control device, the switch switching off the connection line to disconnect the voice coding/decoding unit from the telephone network when none of the telephone services is provided by the data processing device, and when one of the telephone services is provided by the data processing device, the switch switching on the connection line to connect the voice coding/decoding unit to the telephone network.

13. The communication control device according to claim 10 wherein the telephone unit includes a display connected to the data processing device, said communication control device further comprising a dialing end timing detection unit to detect a dialing end timing based on a condition of a telephone line from the telephone unit, wherein the data processing device causes the display of the telephone unit to display an input telephone number and a confirmation message thereon when the dialing end timing is detected by the dialing end timing detection unit.

14. The communication control device according to claim 10, wherein the command signal detection unit detects one of a dual-tone multiple frequency command signal, a dial-pulse command signal and a frequency-based command signal as the command signal sent by the telephone unit.

15. The communication control device according to claim 10, wherein the line unit connects the telephone unit to the telephone network and disconnects the command signal detection unit from the telephone unit when power is not supplied to the communication control device.

16. A method of executing a telephone service processing in a communication support system wherein a telephone unit is connected through a communication control device into a data processing device and the communication control device is connected to a telephone network, the method comprising:

determining whether power is supplied to the communication control device;

performing one of connecting the telephone unit to the telephone network and disconnecting the command signal detection unit from the telephone unit when power is not supplied to the communication control device and connecting the telephone unit through the command signal detection unit to the data processing device and the telephone network when power is supplied to the communication control device;

connecting the data processing device to the communication device through a computer interface;

detecting a command signal sent by the telephone unit, the command signal having a specified value allocated to one of a plurality of telephone services comprising file transmission start or file transmission end;

notifying the data processing device via the computer interface that the command signal is detected;

transmitting the command signal and control data from the communication control device to the data processing device;

determining which of the plurality of telephone services is indicated by the command signal from the telephone unit; and starting execution of a telephone service processing for the telephone service determined, in response to notifying of the command signal detection, so that the one of the plurality of telephone services is remotely provided to the telephone unit.

17. A computer readable medium storing program code for causing a processor to execute a telephone service processing in a communication support system wherein a telephone unit is connected through a communication control device into a data processing device and the communication control device is connected to a telephone network, comprising:

determining whether power is supplied to the communication control device and performing one of connecting the telephone unit to the telephone network and disconnecting the command signal detection unit from the telephone unit when power is not supplied to the communication control device and connecting the telephone unit through the command signal detection unit to the data processing device and the telephone network when power is supplied to the communication control device;

detecting a command signal sent by the telephone unit, the command signal having a specified value allocated to one of a plurality of telephone services comprising file transmission start or file transmission end, and sending a notification to the data processing device via a computer interface that the command signal is detected;

transmitting the command signal and control data from the communication control device to the data processing device;

determining which of the one of the plurality of telephone services is indicated by the command signal from the telephone unit; and beginning execution of a telephone service processing for the one of the plurality of telephone services, in response to the notification by the first program code unit, so that the one of the plurality of telephone services is remotely provided to the telephone unit.

18. The computer readable medium according to claim 17, further comprising:

executing a voice recording processing to record a voice signal on a connection line of the telephone unit and the telephone network;

storing voice data, derived from the voice signal on the connection line, in a memory; and executing a voice playback processing to reproduce the voice signal from the voice data stored in the memory.

19. The computer readable medium according to claim 17, further comprising:

controlling a voice input/output unit so that the voice input/output unit supplies a voice signal sent from one of the telephone unit and the telephone network, to the data processing device; and controlling the voice input/output unit so that the voice input/output unit supplies a voice signal derived from digital data stored in the data processing device, to one of the telephone unit and the telephone network.

20. The computer readable medium according to claim 17, further comprising:

receiving transmission data from the communication control device;

storing the received transmission data in a memory; and transmitting the transmission data stored in the memory to the communication control device.

* * * * *